US011967789B2

(12) United States Patent
Nakamura et al.

(10) Patent No.: US 11,967,789 B2
(45) Date of Patent: Apr. 23, 2024

(54) COAXIAL ELECTRICAL CONNECTOR WITH CLAMPING FEATURE FOR CONNECTING TO A CABLE

(71) Applicant: I-PEX Inc., Kyoto (JP)

(72) Inventors: Hiroki Nakamura, Machida (JP); Adam Takuma Nagao, San Jose, CA (US)

(*) Notice: Subject to any disclaimer, the term of this patent is extended or adjusted under 35 U.S.C. 154(b) by 169 days.

(21) Appl. No.: 17/391,033

(22) Filed: Aug. 2, 2021

(65) Prior Publication Data

US 2021/0391675 A1 Dec. 16, 2021

Related U.S. Application Data

(63) Continuation of application No. PCT/JP2020/003790, filed on Jan. 31, 2020, and a (Continued)

(30) Foreign Application Priority Data

Feb. 14, 2019 (JP) ................................ 2019-024715
Feb. 14, 2019 (JP) ................................ 2019-024718
Feb. 14, 2019 (JP) ................................ 2019-024719

(51) Int. Cl.
*H01R 24/38* (2011.01)
*H01R 12/71* (2011.01)
(Continued)

(52) U.S. Cl.
CPC ........... *H01R 24/38* (2013.01); *H01R 12/716* (2013.01); *H01R 13/6474* (2013.01); (Continued)

(58) Field of Classification Search
CPC .. H01R 24/38; H01R 12/716; H01R 13/6474; H01R 13/6476; H01R 13/6581; (Continued)

(56) References Cited

U.S. PATENT DOCUMENTS 8,998,641 B2 4/2015 Kanda
9,941,646 B1 * 4/2018 Hashimoto .......... H01R 13/658
(Continued)

FOREIGN PATENT DOCUMENTS

CN 102365794 2/2012
CN 103457012 12/2013
(Continued)

OTHER PUBLICATIONS

International Preliminary Report on Patentability with Written Opinion dated Aug. 19, 2021 for PCT/JP2020/003790.
(Continued)

*Primary Examiner* — Abdullah A Riyami
*Assistant Examiner* — Justin M Kratt
(74) *Attorney, Agent, or Firm* — SOEI PATENT & LAW FIRM

(57) ABSTRACT

In a plug connector, a ground contact conductor includes: a fitting portion to fit to a ground contact conductor of a mate connector; and a clamp portion to hold a second exposing portion of a coaxial cable (a portion of a terminal portion of the coaxial cable where a part of an insulating sheath has been removed) to contact a shield exposed at the second exposing portion, without the ground contact conductor overlapping an outer peripheral surface of the insulating sheath. The clamp portion is located at an end of the ground contact conductor farthest from the fitting portion. The second exposing portion is adjacent to a first exposing portion formed at the terminal portion where a signal line is exposed.

18 Claims, 19 Drawing Sheets

Related U.S. Application Data continuation of application No. PCT/JP2020/003804, filed on Jan. 31, 2020, and a continuation of application No. PCT/JP2020/003806, filed on Jan. 31, 2020.

(60) Provisional application No. 62/800,572, filed on Feb. 4, 2019.

(51) Int. Cl.

| | |
|---|---|
| ***H01R 13/6474*** | (2011.01) |
| ***H01R 13/6476*** | (2011.01) |
| ***H01R 13/6581*** | (2011.01) |
| ***H01R 13/6582*** | (2011.01) |
| ***H01R 24/40*** | (2011.01) |
| ***H01R 43/02*** | (2006.01) |
| *H01R 13/58* | (2006.01) |
| *H01R 13/6473* | (2011.01) |

(52) U.S. Cl.

CPC ..... *H01R 13/6476* (2013.01); *H01R 13/6581* (2013.01); *H01R 13/6582* (2013.01); *H01R 24/40* (2013.01); *H01R 43/0207* (2013.01); *H01R 12/712* (2013.01); *H01R 13/5804* (2013.01); *H01R 13/5808* (2013.01); *H01R 13/6473* (2013.01); *H01R 43/02* (2013.01)

(58) Field of Classification Search

CPC ................ H01R 13/6582; H01R 24/40; H01R 43/0207; H01R 12/712; H01R 13/6473; H01R 43/02; H01R 13/5804; H01R 13/5808

See application file for complete search history.

(56) References Cited

U.S. PATENT DOCUMENTS

| | | | | |
|---|---|---|---|---|
| 2003/0049956 | A1 | 3/2003 | Yoshida | |
| 2005/0136700 | A1 | 6/2005 | Keda | |
| 2005/0136701 | A1 | 6/2005 | Keda | |
| 2012/0009817 | A1 | 1/2012 | Tagawa et al. | |
| 2012/0295477 | A1* | 11/2012 | Funahashi ............ | H01R 24/545 439/578 |
| 2013/0115810 | A1 | 5/2013 | Maruyama et al. | |
| 2013/0143437 | A1 | 6/2013 | Kenzaki et al. | |
| 2013/0196540 | A1 | 8/2013 | Sasaki | |
| 2015/0104974 | A1 | 4/2015 | Hirakawa | |
| 2015/0132997 | A1 | 5/2015 | Mitsuno et al. | |
| 2015/0207278 | A1 | 7/2015 | Nakamura | |
| 2018/0102598 | A1 | 4/2018 | Hashimoto et al. | |
| 2020/0036129 | A1 | 1/2020 | Maesoba et al. | |

FOREIGN PATENT DOCUMENTS

| | | |
|---|---|---|
| CN | 104577394 | 4/2015 |
| CN | 204376137 | 6/2015 |
| CN | 105655743 | 6/2016 |
| CN | 107919592 | 4/2018 |
| JP | S52-103793 | 8/1977 |
| JP | S61-099985 | 6/1986 |
| JP | S6199985 U * | 6/1986 |
| JP | H5-059773 | 8/1993 |
| JP | 2000-299171 | 10/2000 |
| JP | 2003-163058 | 6/2003 |
| JP | 2005-116295 | 4/2005 |
| JP | 2005-183212 | 7/2005 |
| JP | 2005-183214 | 7/2005 |
| JP | 2009-099478 | 5/2009 |
| JP | 2009-104836 | 5/2009 |
| JP | 2010-108719 | 5/2010 |
| JP | 2012-243441 | 12/2012 |
| JP | 2013-098121 | 5/2013 |
| JP | 2013-098122 | 5/2013 |
| JP | 2013-101753 | 5/2013 |
| JP | 2013-118121 | 6/2013 |
| JP | 2013-157113 | 8/2013 |
| JP | 2014-002974 | 1/2014 |
| JP | 2015-076312 | 4/2015 |
| JP | 2015-095326 | 5/2015 |
| JP | 2015-138645 | 7/2015 |
| JP | 2016-091657 | 5/2016 |
| JP | 2018-014293 | 1/2018 |
| JP | 2018-116862 | 7/2018 |
| JP | 2018-125241 | 8/2018 |
| KR | 20160092919 A * | 8/2016 |
| WO | 2010/109550 | 9/2010 |
| WO | 2013/150857 | 10/2013 |
| WO | 2014/143081 | 9/2014 |
| WO | 2018/211950 | 11/2018 |
| WO | 2018/221354 | 12/2018 |
| WO | 2018/230251 | 12/2018 |

OTHER PUBLICATIONS

International Preliminary Report on Patentability with Written Opinion dated Aug. 19, 2021 for PCT/JP2020/003804.

International Preliminary Report on Patentability with Written Opinion dated Aug. 19, 2021 for PCT/JP2020/003806.

International Search Report dated Mar. 24, 2020 for PCT/JP2020/003790.

International Search Report dated Mar. 24, 2020 for PCT/JP2020/003804.

International Search Report dated Mar. 24, 2020 for PCT/JP2020/003806.

* cited by examiner

COAXIAL ELECTRICAL CONNECTOR WITH CLAMPING FEATURE FOR CONNECTING TO A CABLE

CROSS-REFERENCE TO RELATED APPLICATIONS

This application is a continuation application of PCT Application No. PCT/JP2020/003790, filed on Jan. 31, 2020, which claims the benefit of priority from U.S. Provisional Patent Application No. 62/800,572, filed on Feb. 4, 2019, and Japanese Patent Application No. 2019-024718, filed on Feb. 14, 2019. Additionally, the present application is a continuation application of PCT Application No. PCT/JP2020/003804, filed on Jan. 31, 2020, which claims the benefit of priority from U.S. Provisional Patent Application No. 62/800,572, filed on Feb. 4, 2019, and Japanese Patent Application No. 2019-024719, filed on Feb. 14, 2019. The present application is also a continuation application of PCT Application No. PCT/JP2020/003806, filed on Jan. 31, 2020, which claims the benefit of priority from U.S. Provisional Patent Application No. 62/800,572, filed on Feb. 4, 2019, and Japanese Patent Application No. 2019-024715, filed on Feb. 14, 2019. The entire contents of the above listed PCT and priority applications are incorporated herein by reference.

BACKGROUND

1. Field

The present disclosure relates to a connector.

2. Description of the Related Art

Japanese Unexamined Patent Application Publication No. 2005-183212 discloses a coaxial electrical connector including an outer conductor having a fitting cylindrical portion, a dielectric housed and held in the fitting cylindrical portion, and a center conductor having a contact portion held by the dielectric and extending in the axis direction of the fitting cylindrical portion. The outer conductor has a lid portion covering an opening of the fitting cylindrical portion, a pair of arms extending in the radial direction from the fitting cylindrical portion, and a surrounding portion which is connected to a connecting portion of the center conductor and surrounds the cable extending in the radial direction between the pair of arms together with the arms.

SUMMARY

A connector according to an aspect of the disclosure is configured to be attached to a coaxial cable having a signal line, a shield, a dielectric layer covering the signal line, a shield covering the dielectric layer, and an insulating sheath covering the shield. The connector comprises: a signal contact conductor comprising: a contact portion configured to contact a mate signal contact portion of a mate connector; and a connection portion configured to connect to the signal line exposed at a first exposing portion formed at a terminal portion of the coaxial cable; a ground contact conductor comprising: a fitting portion surrounding the contact portion and configured to fit to a mate ground contact portion of the mate connector; and a clamp portion configured to hold a second exposing portion of the coaxial cable adjacent to the first exposing portion and contact the shield exposed at the second exposing portion, without the ground contact conductor overlapping an outer peripheral surface of the insulating sheath.

DETAILED DESCRIPTION

Figure 1:
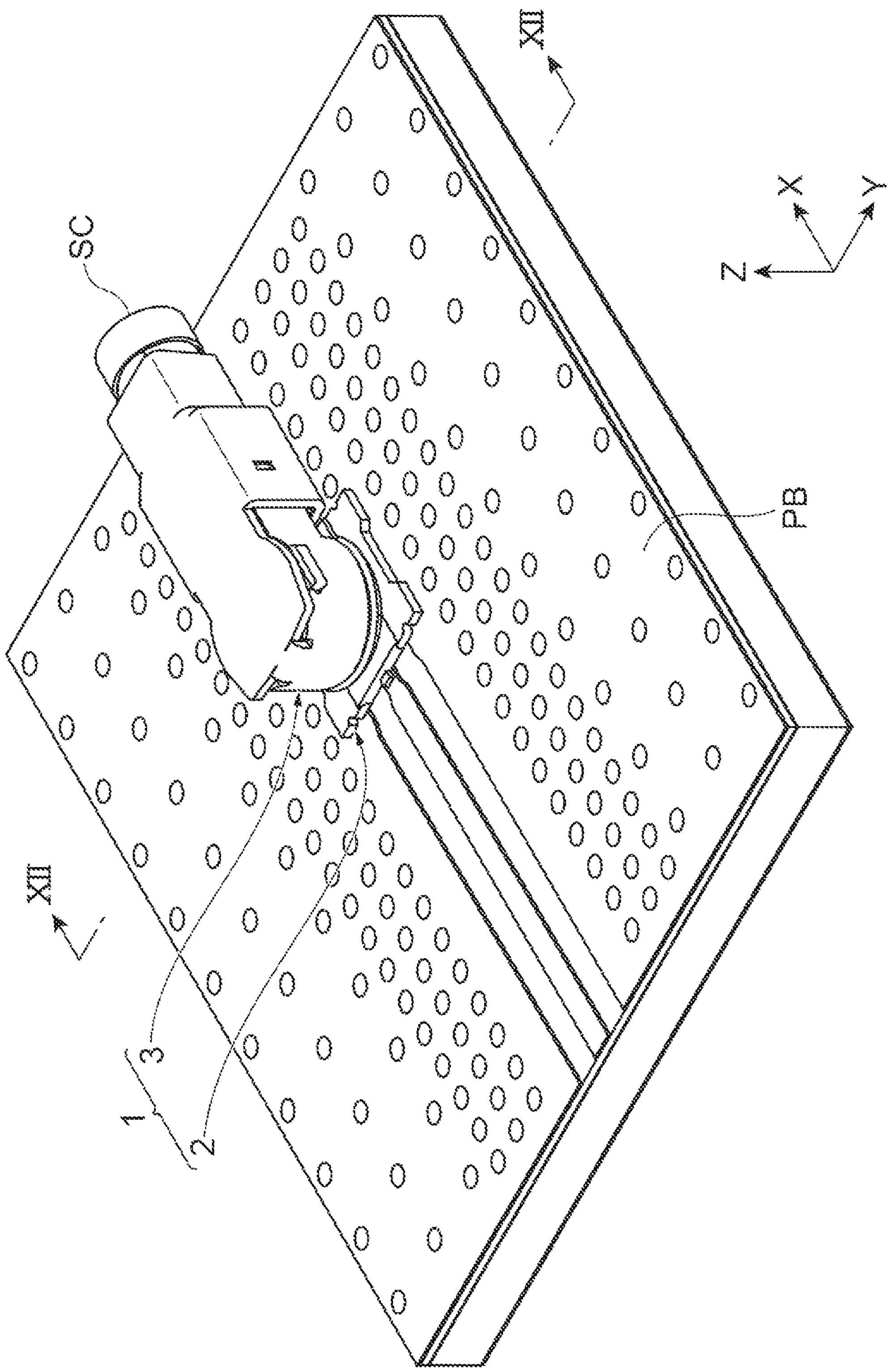
FIG. 1 is a perspective view of an example connector assembly.

Hereinafter, with reference to the drawings, the same elements or similar elements having the same function are denoted by the same reference numerals, and redundant description will be omitted.

Summary of Connector Assembly

The outline of the connector assembly will be described with reference to FIG. 1. As shown in FIG. 1, a connector assembly 1 comprises a receptacle connector 2 and a plug connector 3. The connector assembly 1 is a connector that electrically connects a cable-like signal transmission medium to an electrical circuit of a circuit board. For example, the connector assembly 1 is an RF (Radio Frequency) connector. The signal transmission medium is a medium for transmitting signals of various electronic devices such as mobile phones. For example, the signal transmission medium is a coaxial cable SC. The circuit board is, for example, a printed circuit board PB. In some examples, the connector assembly 1 is coaxial to the connector that electrically connects the coaxial cable SC to the electrical circuit of the printed circuit board PB. In the connector assembly 1, the plug connector 3 attached to a terminal portion of the coaxial cable SC fits the receptacle connector 2 mounted in the printed circuit board PB, thereby electrically connecting the coaxial cable SC and the electric circuit of the printed circuit board PB (described in further detail later).

In the following description, an axis direction of the coaxial cable SC is sometimes referred to as an "X direction", a fitting direction in which the receptacle connector 2 and the plug connector 3 when the receptacle connector 2 and the plug connector 3 fit is sometimes referred to as a "Z direction", and a direction orthogonal to the X direction and the Z direction is sometimes referred to as a "Y direction". In addition, in the Z direction, for example, the plug connector 3 side and the receptacle connector 2 side in the state illustrated in FIG. 1 may be described as "upper" and "lower", respectively. In particular, in the description of the plug connector 3, with respect to the X direction, an end portion of the coaxial cable SC to which the plug connector 3 is attached may be described as "tip", and the opposite end portion may be described as "back end (base end)".

Receptacle Connector

Figure 2:
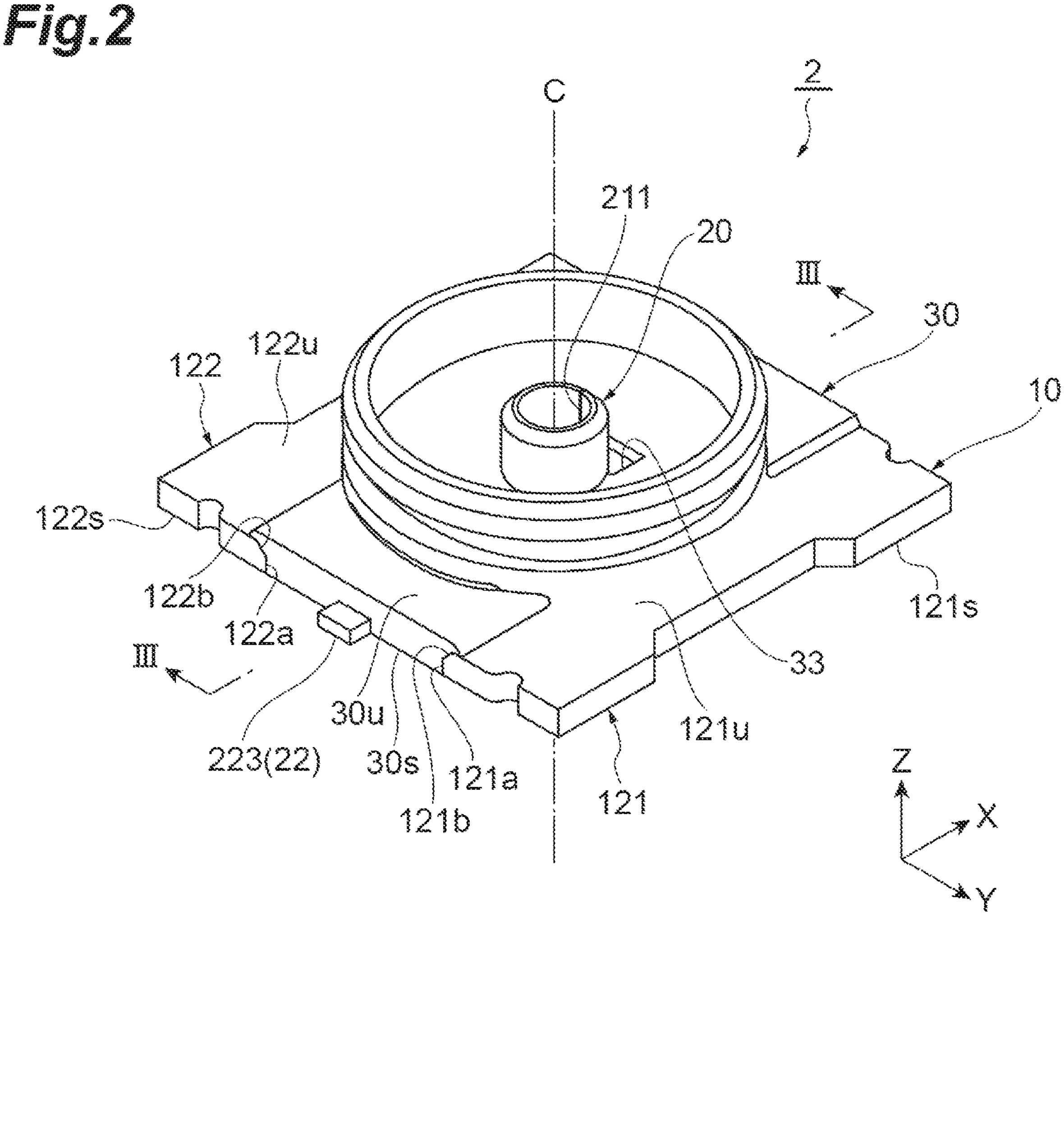
FIG. 2 is a perspective view of an example receptacle connector included in the connector assembly of FIG. 1.
Figure 3:
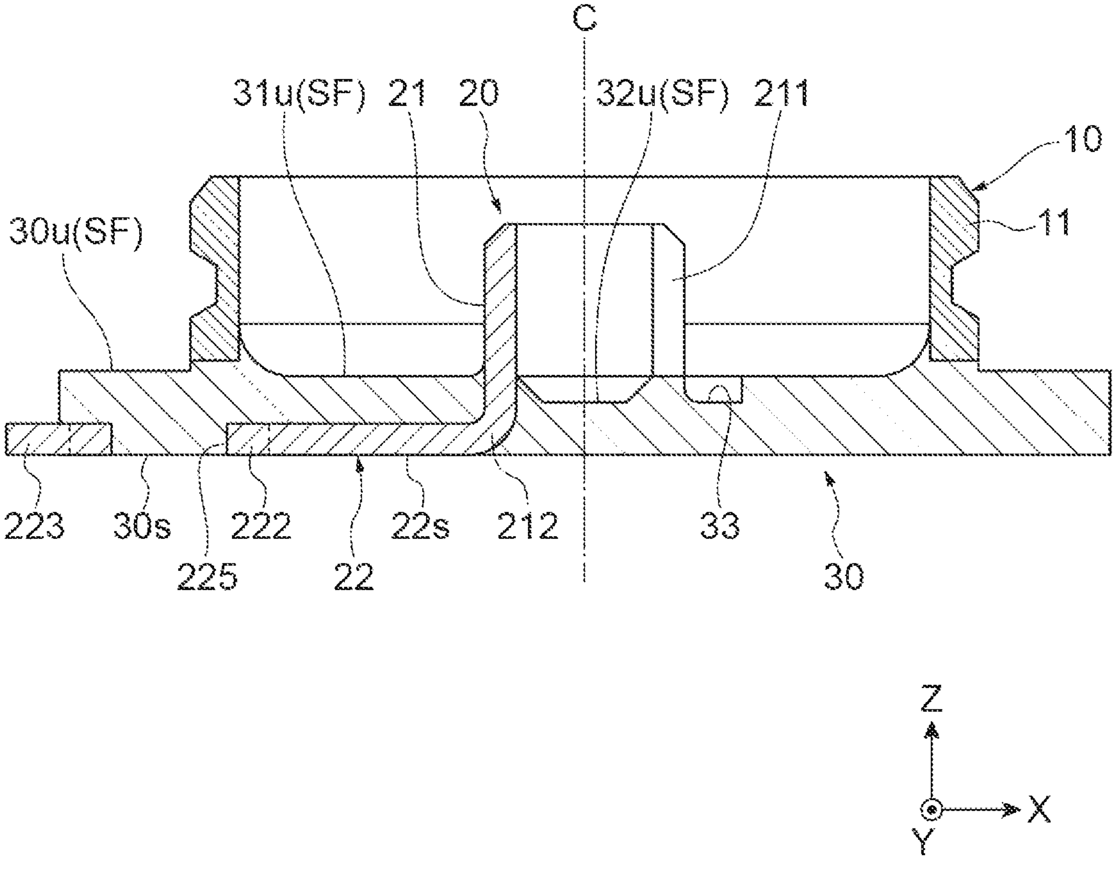
FIG. 3 is a cross-sectional view taken along line of the receptacle connector of FIG. 2.

Details of the receptacle connector 2 will be described with reference to FIGS. 2 to 5. As shown in FIGS. 2 and 3, the receptacle connector 2 has a ground contact conductor 10, a signal contact conductor 20, and a housing 30. The receptacle connector 2 is mounted on the printed circuit board PB (see FIG. 1), for example by soldering.

Ground Contact Conductor

Figure 4:
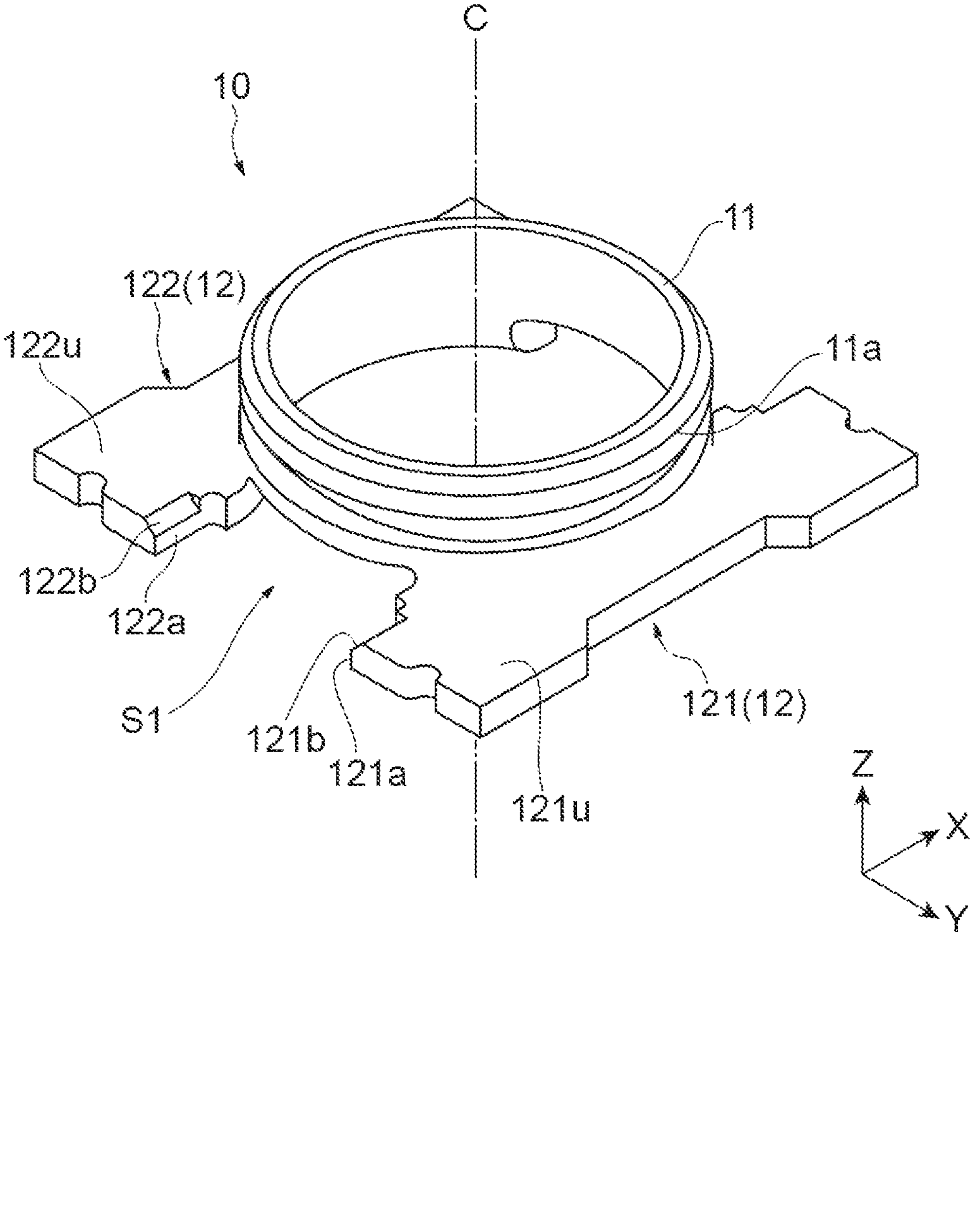
FIG. 4 is a perspective view of an example ground contact conductor.

The ground contact conductor 10 is a member for grounding formed of, for example, a thin plate-shaped metallic member. The ground contact conductor 10 is arranged so as to surround a contact portion 21 of the signal contact conductor 20. As shown in FIG. 4, the ground contact conductor 10 has a ground main body 11 (a main body) formed cylindrically (tubular) and an external terminal portion 12 extending outward from one end edge (a lower end in FIG. 4) in the Z direction of the ground main body 11.

The ground main body 11 is a cylindrical member and extends in the vertical direction (the Z direction) along the central axis C. That is, the central axis C direction of the ground main body 11 corresponds to the vertical direction (the Z direction). The ground main body 11 is connected to the ground contact conductor of the plug connector 3 from the other end edge (upper end in FIG. 4) in the Z direction. In an outer peripheral surface of the ground main body 11, a groove 11*a* used for fitting with the plug connector 3 is provided along the circumferential direction.

As shown in FIG. 4, the external terminal portion 12 is a planar member extending horizontally (an XY direction). The external terminal portion 12 extends outward from the lower end portion of the ground main body 11. The external terminal portion 12 includes a pair of terminal portions 121 and 122 arranged opposite to each other in the Y direction across the central axis C of the ground main body 11 extending in the vertical direction. Each of the pair of the terminal portions 121 and 122 portions projects outward away from the central axis C. The terminal portions 121 and 122 have substantially the same rectangular shape, and are connected to the lower end of the ground main body 11 in a state of being separated from each other with the central axis C interposed therebetween such that the longitudinal direction of each of the terminal portions 121 and 122 is along the X direction. Therefore, an opposing surface 121*a* of a terminal portion 121 facing a terminal portion 122 and an opposing surface 122*a* of the terminal portion 122 facing the terminal portion 121 extend along the X direction below the ground main body 11. Between the opposing surface 121*a* and the opposing surface 122*a*, a gap S1 extending along the longitudinal direction (the X direction) of the terminal portions 121 and 122 is formed, and the gap S1 is filled with an insulating member serving as the housing 30.

The opposing surface 121*a* of the terminal portion 121 extends substantially in the vertical direction (the Z direction), and an inclined portion 121*b* inclined with respect to the vertical direction is formed in a part thereof. The inclined portion 121*b* is inclined to cut away a portion of the opposing surface 121*a* of the terminal portion 121 to an upper surface 121*u* side. Similar to the inclined portion 121*b*, an inclined portion 122*b* inclined with respect to the vertical direction is formed in a part of the opposing surface 122*a* of the terminal portion 122. The inclined portion 122*b* is inclined to cut away a portion of the opposing surface 122*a* of the terminal portion 122 to an upper surface 122*u* side. By providing the inclined portions 121*b* and 122*b*, adhesion between the ground contact conductor 10 and the housing 30 is enhanced.

The ground contact conductor 10 can be manufactured by, for example, pressing and bending a thin plate-shaped metallic material, but may be manufactured by a different process. The ground contact conductor 10 is soldered to a ground conductive path (not shown) for ground connection formed on the printed circuit board PB (see FIG. 1).

Signal Contact Conductor

The signal contact conductor 20 is a signal transmission conductor formed of, for example, a thin plate-shaped metallic member.

Figure 5A:
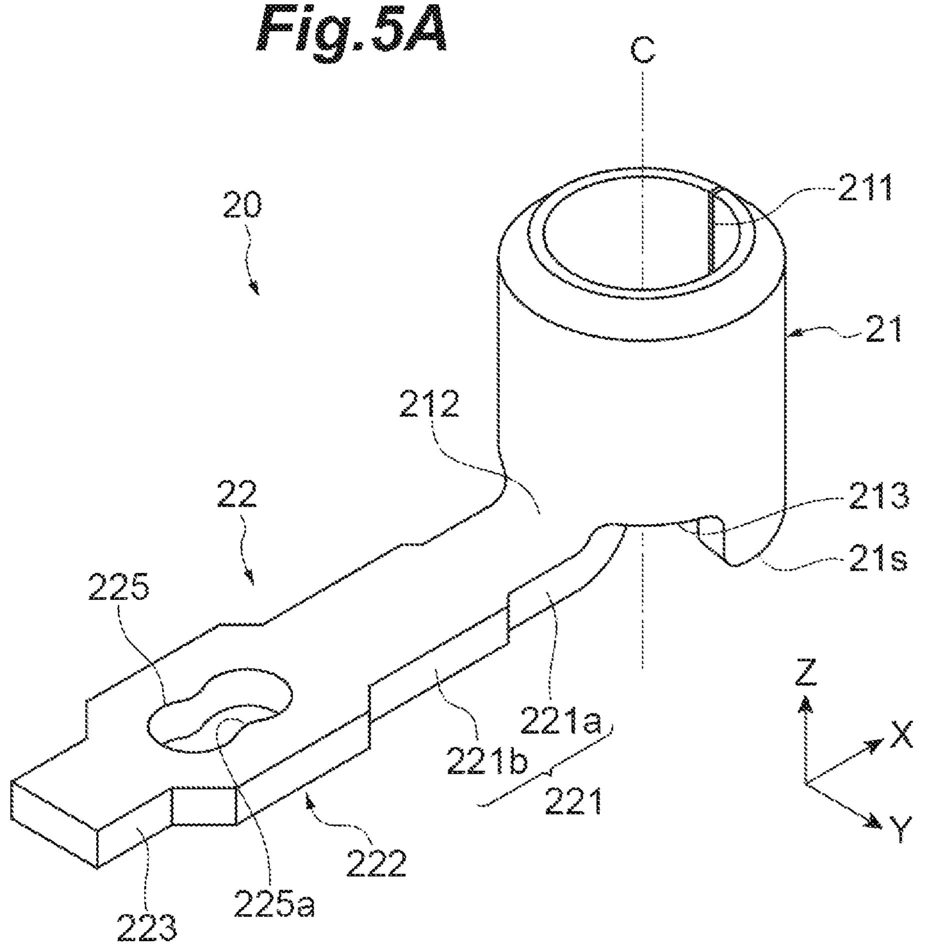
FIG. 5A is a perspective view of an example signal contact conductor included in the receptacle connector.
Figure 5B:
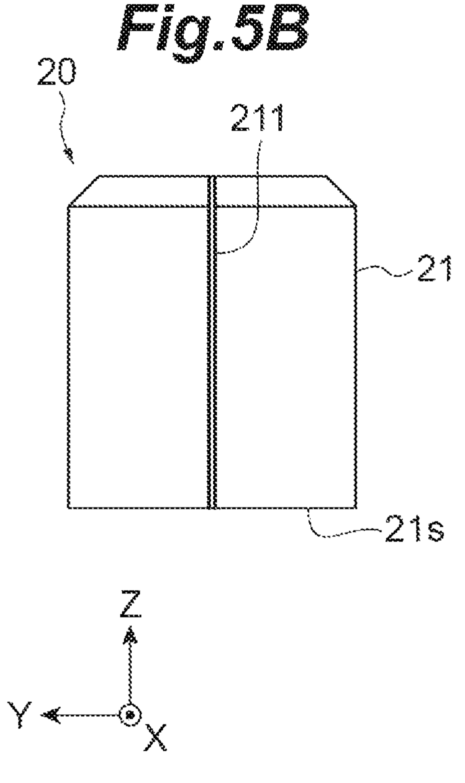
FIG. 5B is a right side view of the signal contact conductor of FIG. 5A.

As shown in FIG. 5, the signal contact conductor 20 has the contact portion 21 cylindrically formed and a conductor portion 22 extending outward from the lower end of the contact portion 21, which is the end edge on one side in the Z direction.

The contact portion 21 is substantially cylindrical and extends in a vertical direction (the Z direction) along the central axis C. The outer diameter of the contact portion 21 is smaller than the inner diameter of the ground main body 11 of the ground contact conductor 10. The contact portion 21 has a slit 211 that extends along an extending direction of the central axis C (the vertical direction: the Z direction). The slit 211 extends in the Z direction to both ends of the tubular contact portion 21. Therefore, the contact portion 21 has a substantially C-shape having the slit 211 in a plan view along a plane orthogonal to the central axis C. The contact portion 21 is connected to the signal contact conductor (described in further detail later) of the plug connector 3 from the other end edge (the upper end in FIG. 5).

The conductor portion 22 is formed in a planar shape extending horizontally (the XY direction). The conductor portion 22 extends outward from the lower end portion of the contact portion 21, i.e., in a direction away from the central axis C. In the example shown in FIG. 5, the conductor portion 22 extends in the −X direction with respect to the central axis C such that the X direction is the longitudinal direction. In some examples, the extending direction of the main surface of the conductor portion 22 is horizontally oriented, but may also be oriented in other directions which intersect the central axis C.

In the conductor portion 22, a first region 221, a second region 222, and a third region 223 are arranged in this order along the extending direction (the X direction) from a portion close to the contact portion 21. The first region 221 is a region that connects to the contact portion 21. The third region 223 is a region of the conductor portion 22 including an end portion opposite to an end portion closer to the contact portion 21. The second region 222 is a region between the first region 221 and the third region 223.

The conductor portion 22 has a width (along the Y direction) that varies with the position in the extending direction in the longitudinal direction. In particular, the widths of the first region 221, the second region 222 and the third region 223 differ from each other in adjacent regions. In particular, the first region 221 and the third region 223 are the regions, which are narrower in the width than the second region 222. In addition, the first region 221 has two regions 221*a* and 221*b* in which the width is different from each other in order from the contact portion 21. A region 221*a* is the region where the width is narrower than a region 221*b*, and the width is the narrowest minimum portion of the conductor portion 22. The second region 222 also includes a maximum portion, which is the largest width of the conductor portion 22. As shown in FIG. 5A, the width of the conductor portion 22 decreases stepwise from the maximum portion of the second region 222 where the width is wide toward the contact portion 21, that is, from the maximum portion of the second region 222 toward the regions 221*b* and 221*a* of the first region 221. In addition, the width with the conductor portion 22 decreases from the maximum portion, which is the width of the second region 222, to the third region 223.

The variation of the width in accordance with the position of the extending direction in the longitudinal direction of the conductor portion 22 may be used to limit the reduction of characteristic impedance in the receptacle connector 2. In radio frequency region impedance matching is required at connectors. In the receptacle connector 2, the shape of the ground contact conductor 10, the shape of the signal contact conductor 20, and the distance between the ground contact conductor 10 and the signal contact conductor 20 vary the characteristic impedance of each part. As described above, by adopting a structure in which the width of the conductor portion moves in accordance with the position of the extending direction, the characteristic impedance may be finely adjusted and any unintended variation of the characteristic impedance may be reduced or avoided. In addition, when the extending direction of the main surface of the conductor portion 22 is in a direction crossing the central axis C, the characteristic impedance can be more suitably adjusted by the variation in width. In some examples, the variation of the width along the longitudinal direction (the X direction) of the conductor portion 22 may be stepwise, or for example, the conductor portion 22 may be tapered so that the width gradually changes.

The second region 222 of the conductor portion 22 is provided with a through hole 225. As shown in FIG. 5A, the through hole 225 extends along the extending direction (the X direction) of the conductor portion 22. In some examples, the through hole 225 has a region 225*a* in which the diameter becomes smaller near the center along the extending direction. However, the shape of the through hole 225 may be configured differently in other examples. The width of the through hole 225 (along the Y direction) can be about 30% to 70% of the width of the maximum portion in the second region 222, depending on the design criteria. A part of the housing 30 enters the through hole 225. The through hole 225 is provided at a position overlapping the ground main body 11 of the ground contact conductor 10 when viewed from a direction along the central axis C (see FIG. 3). Thereby, the decrease of the characteristic impedance in the receptacle connector 2 is prevented.

Figure 5C:
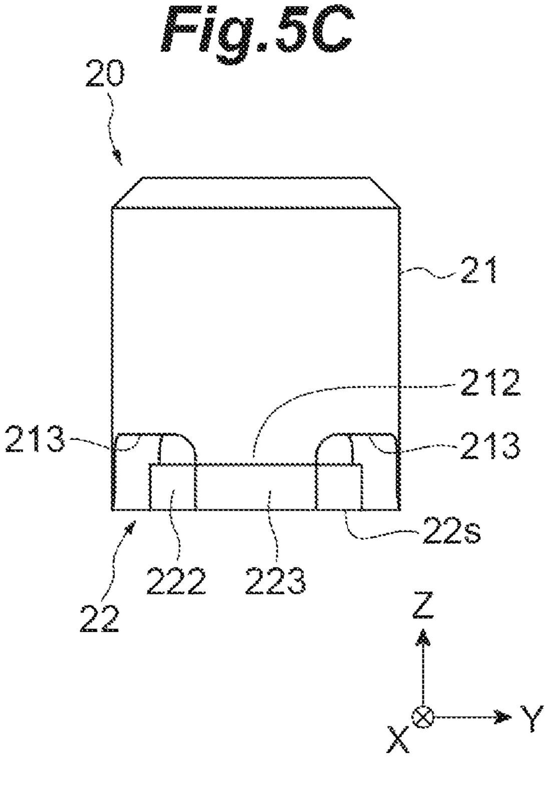
FIG. 5C is a left side view of the signal contact conductor of FIG. 5A.

The contact portion 21 and the conductor portion 22 are connected by providing the first region 221 of the conductor portion 22 to the end edge of the lower side (−Z side) of the contact portion 21. Around a connector 212 with the conductor portion 22 in the contact portion 21, two cutout portions 213 are provided which are arranged to sandwich the connector 212. A lower surface 21*s* of the contact portion 21 and a lower surface 22*s* of the conductor portion 22 are formed to be on the same plane (an XY plane) as shown in FIGS. 3 and 5C. As shown in FIG. 5C, the cutout portions 213 form openings that communicate the inside and the outside of the contact portion 21 above a height position at which a lower end surface in the vertical direction (the Z direction) of the contact portion 21 and the conductor portion 22 is provided.

The signal contact conductor 20 can be formed by bending a metallic plate. The signal contact conductor 20 can be obtained by providing a metallic plate having a shape corresponding to the signal contact conductor 20, folding the metallic plate at the connector 212 between the conductor portion 22 and the contact portion 21, and cylindrically bending the region to be the contact portion 21.

As shown in FIGS. 2 and 3, the signal contact conductor 20 is positioned such that the contact portion 21 of the signal contact conductor 20 is inside the ground main body 11 of the ground contact conductor 10. The conductor portion 22 connected to the contact portion 21 of the signal contact conductor 20 is then placed in the gap S1 provided between the terminal portions 121 and 122 of the ground contact conductor 10 and extending along the longitudinal direction (the X direction). At this time, the lower surfaces 121*s* and 122*s* of the terminal portions 121 and 122 in the ground contact conductor 10, the lower surface 21*s* of the contact portion 21 in the signal contact conductor 20, and the lower surface 22*s* of the conductor portion 22 in the signal contact conductor 20 are arranged to be on the same plane (the XY plane). The ground contact conductor 10 and the signal contact conductor 20 are integrated to form the housing 30 by injecting insulating resins into the mold set in this state.

The shapes of the contact portion 21 and the conductor portion 22 can be changed. In addition, the contact portion 21 and the conductor portion 22 may not be made of one metallic plate, and may be configured by a combination of a plurality of members.

Housing

The housing 30 is an insulating member placed on the printed circuit board PB.

As shown in FIGS. 2 and 3, the housing 30 is provided to fill the gap S1 provided between the terminal portions 121 and 122 included in the external terminal portion 12 of the ground contact conductor 10. As shown in FIG. 2, an upper surface 30*u* (SF) of the housing 30 located between the terminal portions 121 and 122 is generally flush with the upper surface 121*u* and 122*u* of the terminal portions 121 and 122, and a lower surface 30*s* of the housing 30 is generally flush with the lower surfaces 121*s* and 122*s* of the terminal portions 121 and 122.

As shown in FIG. 3, the housing 30 also connects to the lower end of the ground main body 11 of the ground contact conductor 10. This means that both the ground main body 11 and the external terminal portion 12 of the ground contact conductor 10 are connected to the housing 30. Furthermore, the housing 30 is connected to the inclined portions 121*b* and 122*b* provided in the opposing surfaces 121*a* and 122*a* of each of the terminal portions 121 and 122. Thereby, the contact area between the housing 30 and the terminal portions 121, 122 is increased, and the adhesion between the housing 30 and the ground contact conductor 10 is enhanced.

Further, as shown in FIGS. 2 and 3, the housing 30 is provided so as to be in contact with the lower end of the contact portion 21 of the signal contact conductor 20 and to fill the periphery except the lower surface 22*s* of the conductor portion 22. At this time, a part of the housing 30 enters the through hole 225 provided in the second region 222 of the conductor portion 22 to fill the through hole 225. As a result, the adhesion between the housing 30 and the signal contact conductor 20 is enhanced. It should be noted that the end portion of the conductor portion 22 in the signal contact conductor 20, which is opposite to the contact portion 21, i.e., the end portion of the third region 223, is not covered by the housing 30 and is exposed to the outside.

The housing 30 is formed inside the contact portion 21 and also outside the contact portion 21 and inside the ground main body 11. The housing 30 is provided so as to cover the periphery of the connector 212 with the contact portion 21 and the lower end of the contact portion 21. As shown in FIG. 3, an upper surface 31*u* (SF) in the housing 30 inside the ground main body 11 and outside the contact portion 21 in the ground contact conductor 10 is approximately the same as the upper surface 30*u* in the housing 30 between the terminal portions 121 and 122. On the other hand, an upper surface 32*u* (SF) of the housing 30 inside the contact portion 21 has a lower position (height) from the lower surface 30*s* in the vertical direction (the Z direction) than upper surfaces 30*u* and 31*u*. That is, in the vertical direction (the Z direction), the height of the upper surface 32*u* is located closer to a bottom surface of the housing 30 (the lower surface 30*s*) which faces the printed circuit board PB than the height of the upper surfaces 30*u* and 31*u*. Accordingly, making the height of the upper surface 32*u* of the housing 30 inside the contact portion 21 lower than the height in upper surfaces 30*u* and 31*u* may be used to prevent the insulating material from remaining particularly in the outer peripheral surface with the contact portion 21, and to prevent the electrical connectivity from deteriorating when connecting to a mate connector.

As shown in FIGS. 2 and 3, a part of the upper surface 31*u* in the housing 30 inside the ground main body 11 and outside the contact portion 21 in the ground contact conductor 10 has a recess 33 with a surface lower than the upper surface 31*u*. The recess 33 is formed in the region around the slit 211 located in the contact portion 21 of the signal contact conductor 20 and connected to the slit 211. In some examples, the height of the surface in the recess 33 is the same as the height of the upper surface 32*u* in the housing 30 inside the contact portion 21. However, the recess 33 can be shaped and sized differently, for example such that at least the height of the surface of the housing 30 around the slit 211 outside the contact portion 21 is substantially the same as the height of the upper surface 32*u* of the housing 30 inside the contact portion 21. The phrase "the heights are the same" includes not only a case where the heights are exactly the same but also a case where the difference in height between the upper surface 32*u* and the recess 33 is smaller than the difference in height between the upper surface 31*u* and the upper surface 32*u*.

Receptacle Connector Assembly Process

The assembly process of the receptacle connector 2 will be described. First, the ground contact conductor 10 and the signal contact conductor 20 are prepared. As described above, the ground contact conductor 10 and the signal contact conductor 20 can be produced, for example, by pressing and bending a plate material made of a metallic material.

Next, after the ground contact conductor 10 and the signal contact conductor 20 are set in a mold, an insulating material (for example, insulating resins) is injected into the mold and cooled and solidified. That is, the housing 30 can be made by insert molding, thereby producing the receptacle connector 2 in which the ground contact conductor 10, the signal contact conductor 20, and the housing 30 are integrally molded.

The insulating material injected into the mold fills the gap S1 between the terminal portions 121 and 122 of the ground contact conductor 10 and also penetrates into the through hole 225 provided in the conductor portion 22 of the signal contact conductor 20 located in the gap S1. The insulating material also enters the interior of the contact portion 21 through the cutout portion 213 located below the contact portion 21 in the signal contact conductor 20. As a result, the insulating material inside the contact portion 21 and the insulating material outside the contact portion 21 are molded in an integrated state.

When the receptacle connector 2 is manufactured, after the signal contact conductor 20 is set in a mold, a part in the mold can be brought into contact with the outside of the slit 211 of the signal contact conductor 20, in particular, the region to be the recess 33 in the housing 30, when the insulating material is injected. With this configuration, the signal contact conductor 20 can be accurately positioned. In addition, the injected insulating material is prevented from leaking from a portion with which the mold abuts.

Plug Connector

Figure 6:
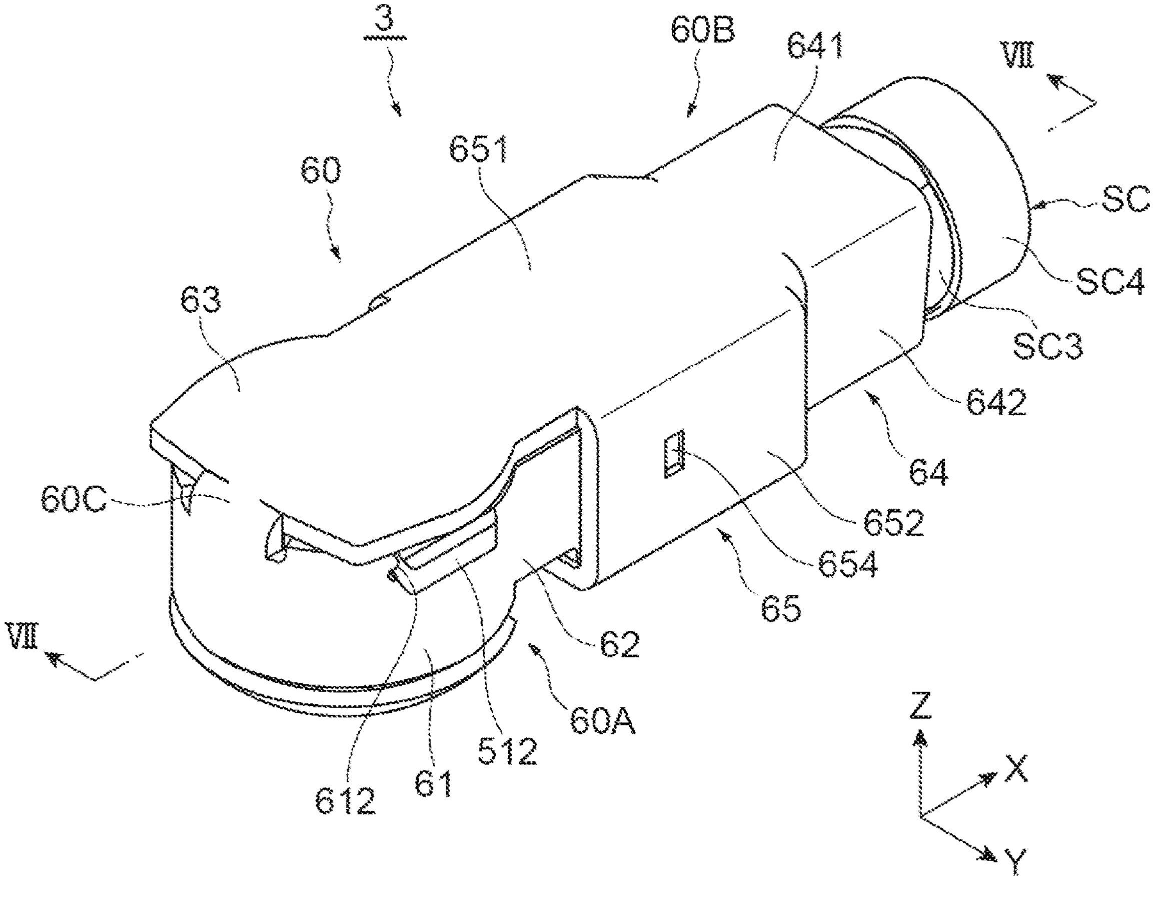
FIG. 6 is a perspective view of an example plug connector included in the connector assembly of FIG. 1.
Figure 7:
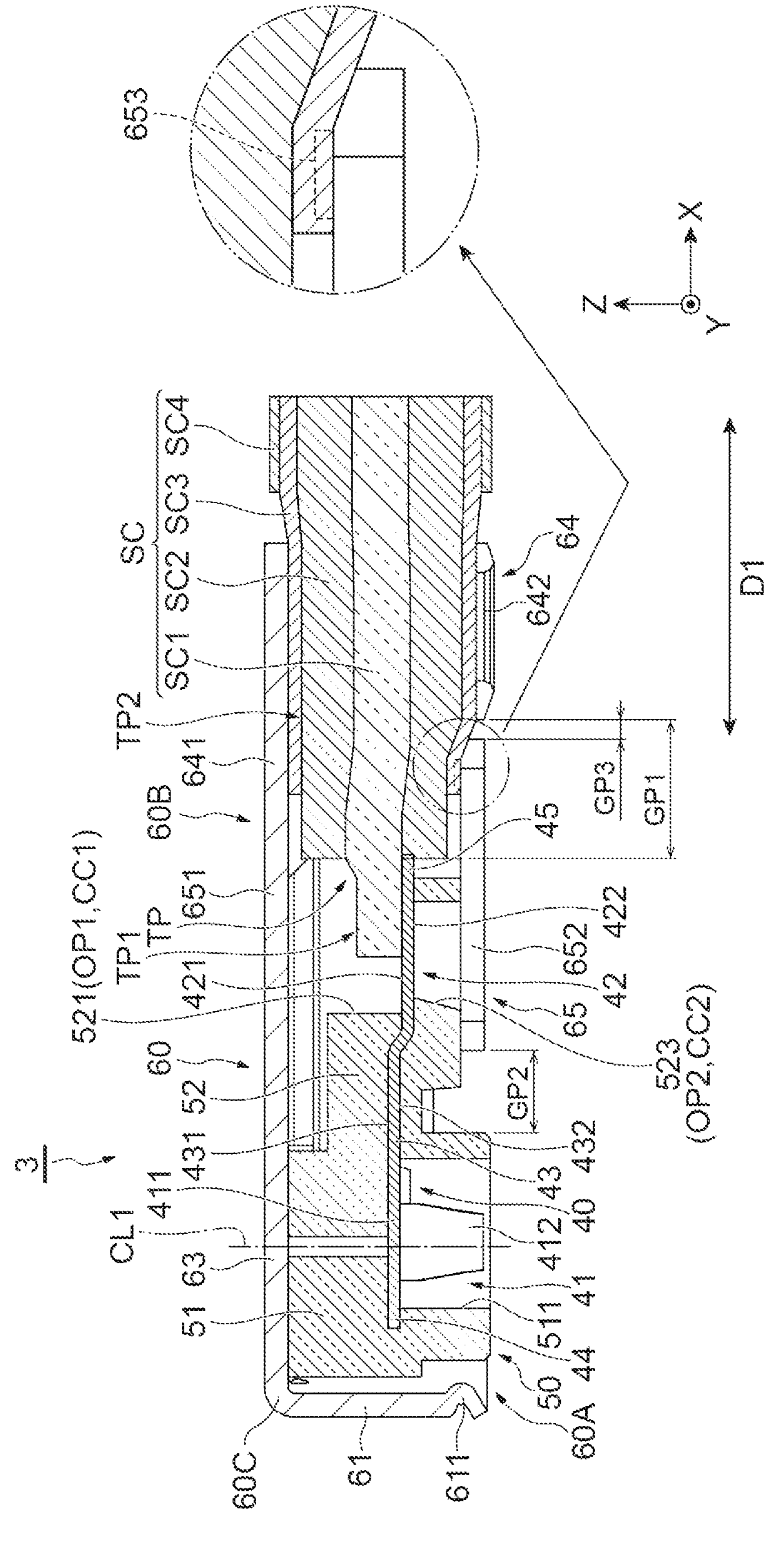
FIG. 7 is a cross-sectional view taken along line VII-VII of the plug connector of FIG. 6.
Figure 8:
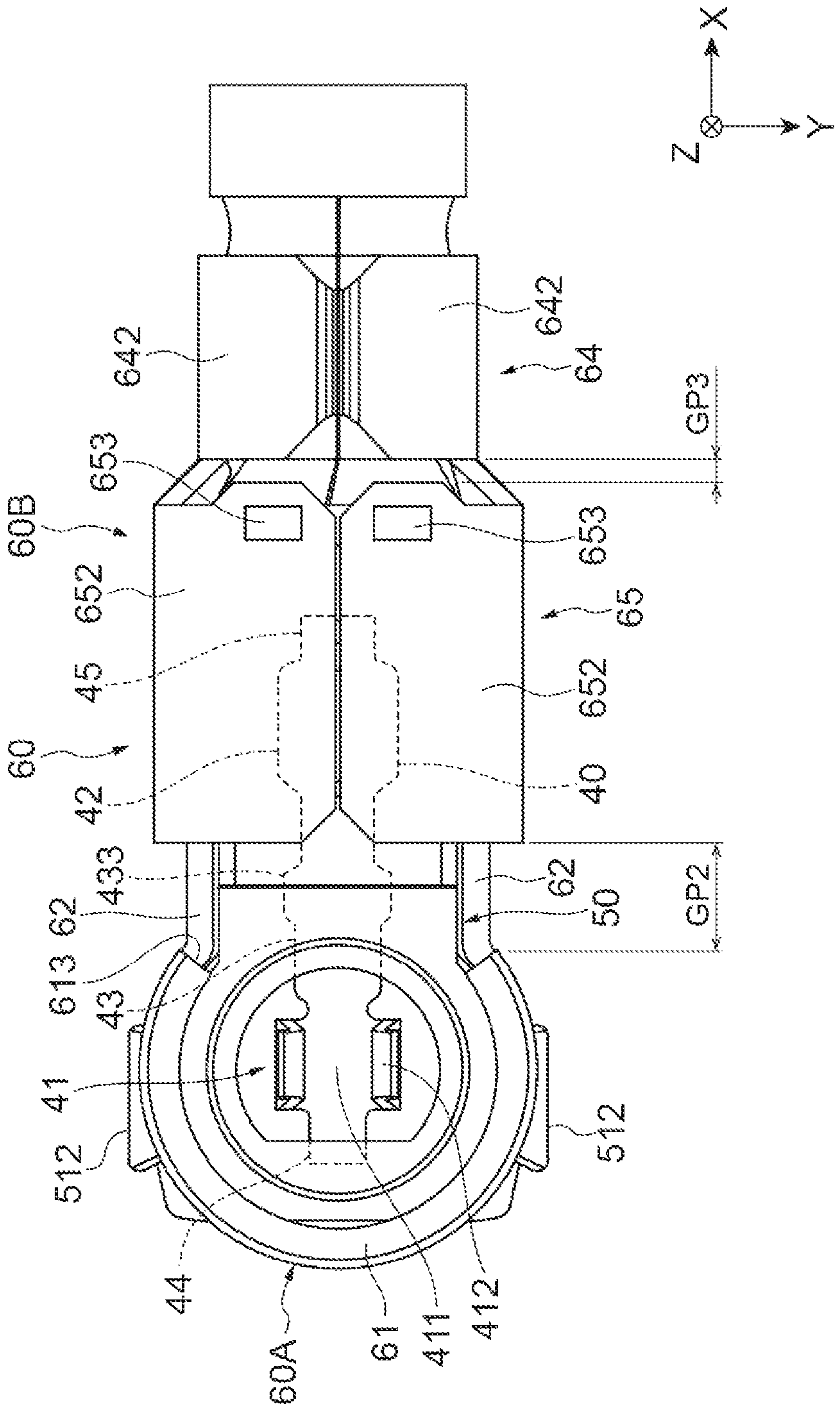
FIG. 8 is a bottom view of the plug connector of FIG. 6.

Next, the plug connector 3 will be described in detail with reference to FIGS. 6 to 12. As shown in FIGS. 6 to 8, the plug connector 3 includes a signal contact conductor 40, a ground contact conductor 60, and an insulating housing 50. The plug connector 3 is attached to a terminal portion TP of the coaxial cable SC.

The coaxial cable SC is a wiring used in a small-sized terminal such as a mobile phone in order to transmit a radio frequency signal between various signal processing elements (for example, an antenna, a control chip for controlling the antenna, a board, and the like) incorporated in the small-sized terminal. As shown in FIG. 7, the coaxial cable SC has a signal line SC1 made of a conductor, a shield SC3 made of a conductor provided around the signal line SC1, a dielectric layer SC2 interposed between the signal line SC1 and the shield SC3, and an insulating sheath SC4 covering the shield SC3.

The plug connector 3 is attached to the terminal portion TP where the signal line SC1 and the shield SC3 are partially exposed. More particularly, the plug connector 3 is attached to the terminal portion TP that has been processed to remove the insulating sheath SC4, the shield SC3, and the dielectric layer SC2 such that a portion where the signal line SC1 is exposed (the first exposing portion TP1) and a portion where the shield SC3 is exposed (the second exposing portion TP2) are sequentially arranged from the tip. In the plug connector 3 attached to the terminal portion TP, the signal contact conductor 40 communicates with the signal line SC1, the ground contact conductor 60 communicates with the shield SC3, and the housing 50 intervenes between the signal contact conductor 40 and the ground contact conductor 60.

The plug connector 3 attached to the terminal portion TP is connected to the receptacle connector 2 (mate connector) mounted in the printed circuit board PB. In particular, the plug connector 3 is attached to the receptacle connector 2 along the thickness-wise direction (the Z direction) of the printed circuit board PB. When the plug connector 3 is attached on the receptacle connector 2, the signal contact conductor 40 is electrically connected to the signal contact conductor 20 (mate signal contact conductor) of the receptacle connector 2 and the ground contact conductor 60 is electrically connected to the ground contact conductor 10 (mate ground contact conductor) of the receptacle connector 2. The plug connector 3 attached to the receptacle connector 2 is removable from the receptacle connector 2 along the thickness-wise direction (the Z direction) of the printed circuit board PB.

Hereinafter, example configurations of the ground contact conductor 60, the signal contact conductor 40, and the housing 50 will be described in order.

Ground Contact Conductor

As shown in FIG. 6, the ground contact conductor 60 is formed of, for example, a thin plate-shaped metallic material, and includes a first portion 60A, a second portion 60B, and a connection portion 60C. The first portion 60A has a fitting portion 61 and two arm portions 62. The fitting portion 61 fits the ground contact conductor 10 of the receptacle connector 2. For example, the fitting portion 61 is tubular and fits around the ground main body 11. The clamp portion 64 may be located outside the fitting portion 61 and is configured to hold the second exposing portion TP2 such that an axial direction D1 of the signal line SC1 intersects a radial center line CL1 of the fitting portion 61. The central axis of the fitting portion 61 may be substantially orthogonal to the axial direction D1 of the coaxial cable SC.

As shown in FIG. 7, at one end (hereinafter referred to as a "tip") of the fitting portion 61 in the central axis direction, a diaphragm portion 611 having a partially reduced inner diameter is formed. The diaphragm portion 611 fits the groove 11*a* of the ground main body 11 in the ground contact conductor 10 of the receptacle connector 2 (see FIG. 12). As shown in FIG. 6, a plurality of cutout portions 612 aligned in the circumferential direction of the fitting portion 61 are formed at the other end (hereinafter referred to as a "base end") of the fitting portion 61 in the central axis direction. A plurality of convex portions 512 of the housing 50 is fitted into each of the plurality of cutout portions 612. In some examples, one or more of the above structures described as being "tubular" may include a cylindrical shape. However, "tubular" may be understood to include a polygonal tubular shape or other tubular shapes such as a partially tubular shape in which a part of the circumferential direction is cut out. For example, the fitting portion 61 may be partially cylindrical with a portion near the coaxial cable SC cut out.

The two arm portions 62 are respectively connected to opposite ends (or both ends) of the fitting portion 61 in the circumferential direction, and extend toward the outside of the fitting portion 61 while facing each other. The barrel portion 65 may be configured to hold the pair of arm portions 62 together with the second portion 52. The two arm portions 62 are along the axis direction of the coaxial cable SC.

The second portion 60B has a lid portion 63 (plate-shaped portion), a clamp portion 64, and a barrel portion 65. The lid portion 63 is configured to close the base end of the fitting portion 61 without the lid portion 63 overlapping the outer peripheral surface of the fitting portion 61. The lid portion 63 may extend out of the fitting portion 61 to comprise a part of the barrel portion 65 and a part of the clamp portion 64. In particular, the lid portion 63 is substantially planar over its entire area, and no folds or the like are formed at its peripheral edge to overlap the fitting portion 61. Hereinafter, a surface of the lid portion 63 facing the base end of the fitting portion 61 is referred to as an "inner surface", and a surface opposite to the inner surface is referred to as an "outer surface".

As shown in FIG. 7, the clamp portion 64 contacts the shield SC3 by holding the second exposing portion TP2 (a portion of the terminal portion TP of the coaxial cable SC from which the insulating sheath SC4 has been removed). Hereinafter the second exposing portion TP2 is also referred to as a "held portion of the terminal portion TP". For example, the clamp portion 64 is aligned with the fitting portion 61 along the axis direction of the coaxial cable SC.

For example, the clamp portion 64 includes a clamp base 641 and two clamp arms 642, as shown in FIG. 6. The clamp base 641 is a plate-shaped portion connected to the lid portion 63. Here, the term "connected" includes not only a case of being directly connected but also a case of being connected via another portion.

The two clamp arms 642 are respectively connected to both side surfaces of the periphery of the clamp base 641 along the axis direction of the coaxial cable SC, and protrude from an inner surface of the clamp base 641 (a surface connected to the inner surface of the lid portion 63). The two clamp arms 642 face each other across the held portion of the terminal portion TP, and are bent to wrap the held portion of the terminal portion TP between themselves and the clamp base 641 to contact the shield SC3.

The clamp portion 64 is located at the farthest end from the fitting portion 61 in the ground contact conductor 60. More particularly, in the ground contact conductor 60, the two clamp arms 642 are located at the farthest end from the central axis of the fitting portion 61. In some examples, the ground contact conductor 60 has no portion that contacts (or overlaps) an outer peripheral surface of the insulating sheath SC4 at a location farther from the central axis of the fitting portion 61 than the two clamp arms 642.

The barrel portion 65 is configured to hold the second portion 52 between the fitting portion 61 and the clamp portion. For example, the barrel portion 65 holds the housing 50 between the fitting portion 61 and the clamp portion 64. As described below, the housing 50 has a first portion 51 housed within the fitting portion 61 and a second portion 52 located between the two arm portions 62. The barrel portion 65 holds the second portion 52 with the two arm portions 62.

The barrel portion 65 may include a barrel base 651 and a barrel arm 652 configured to sandwich the second portion 52 between the barrel base 651 and the barrel arm 652. A height of the second portion 52 located between the barrel base 651 and the barrel arm 652 may be smaller than an outer diameter of the second exposing portion TP2. For example, the barrel portion 65 includes a barrel base 651 and two barrel arms 652. The barrel base 651 is a plate-shaped portion that intervenes between and connects the lid portion 63 and the clamp base 641.

The two barrel arms 652 are connected to both side surfaces of the periphery of the barrel base 651 along the axis direction of the coaxial cable SC, and protrude from an inner surface of the barrel base 651 (a surface connected to the inner surface of the lid portion 63). The two barrel arms 652 face each other across the two arm portions 62 and the second portion 52, and are bent so as to enclose the two arm portions 62 and the second portion 52 with the barrel base 651. Hereinafter, in the barrel arm 652, a portion between the bent portion and the barrel base 651 is referred to as a "base portion of the barrel arm 652", and a portion closer to the tip than the bent portion is referred to as a "tip portion of the barrel arm 652".

The ground contact conductor 60 may have two contacting claw portions configured to press the pair of arm portions 62 against the second portion 52. For example, as shown in FIG. 6, the base portion of the barrel arm 652 is formed with a contacting claw portion 654 which projects inward. The contacting claw portion 654 presses the arm portion 62 towards the second portion 52. This enhances electrical connection between the barrel portion 65 and the arm portion 62.

A gap GP1 may be formed between the clamp portion 64 and the second portion 52 to accommodate a portion of the second exposing portion TP2. For example, the length of the barrel portion 65 in the axis direction of the coaxial cable SC (the width of the barrel arm 652) may be set such that a gap GP1 occurs between the housing 50 and the clamp portion 64. In some examples, the arm portion 62 may be configured to further hold the dielectric layer SC2 and the shield SC3 of the second exposing portion TP2 between the housing 50 and the clamp portion 64 (in the gap GP1). Additionally, the ground contact conductor 60 may further include a holding claw portion 653. The holding claw portion 653 protrudes inward from the barrel portion 65 between the housing 50 and the clamp portion 64 to press the shield SC3 toward the dielectric layer SC2. For example, the holding claw portion 653 may be projecting from the barrel arm 652 toward the barrel base 651 to press the shield SC3 against the dielectric layer SC2. The holding claw portion 653 may be located closer to the clamp portion 64 between the housing 50 and the clamp portion 64. For example, the holding claw portion 653 may be located between the second portion 52 and the clamp portion 64 and located closer to the clamp portion 64. In some examples, the distance from the clamp portion 64 to the holding claw portion 653 may be smaller than the distance from the housing 50 to the holding claw portion 653. For example, the holding claw portion 653 is formed at the tip portion of each of the barrel arm 652 (towards the base end of the coaxial cable SC).

The ground contact conductor 60 may have a gap GP2 between the fitting portion 61 and the barrel portion 65 (i.e., between the fitting portion 61 and the barrel arm 652). Further, the ground contact conductor 60 may have a gap GP3 between the barrel portion 65 and the clamp portion 64 (i.e., between the barrel arm 652 and a clamp arm 642).

The connection portion 60C connects the first portion 60A and the second portion 60B. For example, the connection portion 60C connects the lid portion 63 with the base end of the fitting portion 61 at the end portion in the extending direction (the –X direction) of the coaxial cable SC. Prior to assembly of the plug connector 3, the connection portion 60C connects the first portion 60A and the second portion 60B with the lid portion 63 along the central axis of the fitting portion 61. The connection portion 60C is folded at a substantially right angle during assembly of the plug connector 3 such that the lid portion 63 is perpendicular to the central axis of the fitting portion 61 and blocks the base end of the fitting portion 61.

Signal Contact Conductor

Figure 9:
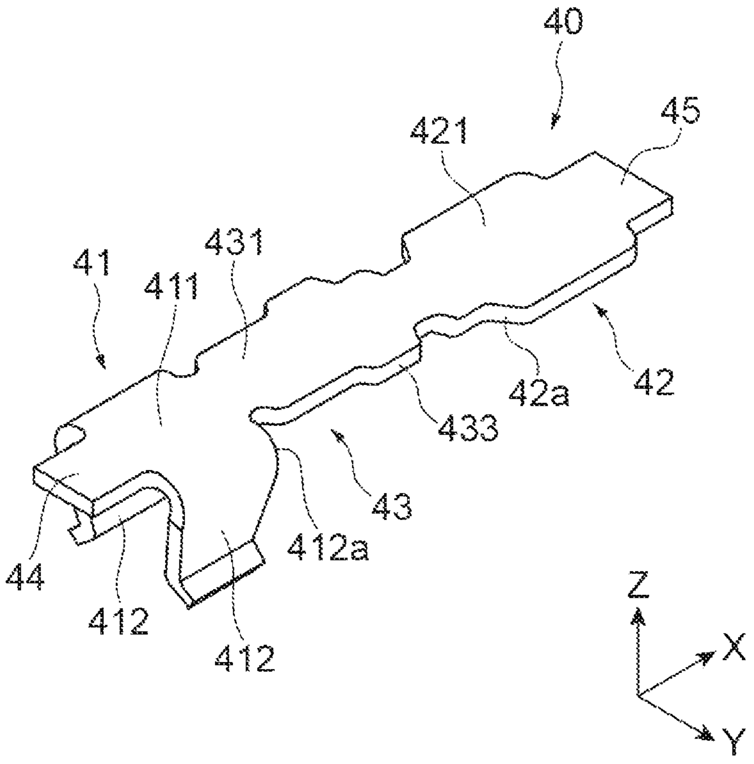
FIG. 9 is a perspective view of an example signal contact conductor.

As shown in FIG. 9, the signal contact conductor 40 is formed of, for example, a metallic member on a thin plate, and is accommodated in the ground contact conductor 60. As shown in FIGS. 7 to 9, the signal contact conductor 40 includes a contact portion 41, a connection portion 42, an intermediate portion 43, and extension portions 44 and 45. The contact portion 41 is located in the fitting portion 61 and contacts the signal contact conductor 20 of the receptacle connector 2.

For example, the contact portion 41 includes a contact base 411 and two contact arms 412. The contact base 411 is arranged substantially perpendicular to the central axis of the fitting portion 61. The two contact arms 412 are respectively connected to both sides of the contact base 411 along the axis direction of the coaxial cable SC, and protrude toward the tip of the fitting portion 61. The two contact arms 412 face each other and sandwich the contact portion 21 of the signal contact conductor 20 with the fitting portion 61 fitting the ground main body 11 of the ground contact conductor 10 in the receptacle connector 2 (see FIG. 12).

The connection portion 42 is located between the fitting portion 61 and the clamp portion 64. The connection portion 42 is located inside the space enclosed by the barrel portion 65 and is connected to the signal line SC1. The fitting portion 61 may be C-shaped to have an opening 613 through which the signal contact conductor 40 passes. The connection portion 42 is a planar portion disposed perpendicular to the central axis of the fitting portion 61. The connection portion 42 has a first main surface 421 facing the barrel base 651 of the barrel portion 65 and a second main surface 422 opposite the first main surface 421, as shown in FIG. 7. The signal line SC1 is connected to the first main surface 421 (a connection surface). Examples of the signal line SC1 connection method include soldering, caulking, and ultrasonic bonding. As an example, the signal line SC1 is connected to the first main surface 421 by ultrasonic bonding.

The intermediate portion 43 is the planar portion that connects the contact base 411 of the contact portion 41 and the connection portion 42. The intermediate portion 43 has a first main surface 431 facing the lid portion 63 and the barrel base 651 and a second main surface 432 opposite the first main surface 431, as shown in FIG. 7. The first main surface 431 (an intermediate surface) is connected to the first main surface 421, and the second main surface 432 is connected to the second main surface 422. The intermediate portion 43 extends from within the fitting portion 61 to within the barrel portion 65, i.e., in the direction connecting the contact portion 41 and the connection portion 42, and connects the contact base 411 and the connection portion 42.

The width of the intermediate portion 43 varies in accordance with the position in the direction (the X direction) connecting the contact portion 41 and the connection portion 42. Here, the width means a dimension in a direction (the Y direction) perpendicular to the axis direction of the coaxial cable SC. The width of the intermediate portion 43 is set to reduce variation of the characteristic impedance between the signal contact conductor 40 and the ground contact conductor 60 depending on the position in the direction (the X direction) connecting the contact portion 41 and the connection portion 42. If the width of the intermediate portion 43 is constant, the characteristic impedance between the intermediate portion 43 and the ground contact conductor 60 varies in accordance with the position in the direction connecting the contact portion 41 and the connection portion 42 (the X direction). For example, the characteristic impedance is low at a position close to the ground contact conductor 60. The characteristic impedance is also lower at locations enclosed by more metal of the ground contact conductor 60. At such locations where the characteristic impedance is low in relation to the ground contact conductor 60, the width in the intermediate portion 43 is greater than at locations where the characteristic impedance is high.

For example, in the gap GP2 (the gap between the fitting portion 61 and the barrel portion 65), the ground contact conductor 60 surrounding the intermediate portion 43 has a lower amount of metals (e.g., an amount of metal per unit-length) (due to absence of the barrel arm 652) than inside the space enclosed by the barrel portion 65, etc. Thus, the portion of the intermediate portion 43 located in the gap GP2 is provided with a widened portion 433 which has larger width than both the portion of the intermediate portion 43 located in the barrel portion 65 and the portion of the intermediate portion 43 located in the fitting portion 61.

The width of the connection portion 42 is larger than the width of the intermediate portion 43. The width of the connection portion 42 may be at least greater than the average value of the intermediate portion 43 in the width, and may be greater than the maximum value of the width of the intermediate portion 43 (e.g., the width of the widened portion 433). In order to accurately define the average value or the like of the width of the intermediate portion 43, the boundary between the contact portion 41 and the connection portion 42 and the boundary between the connection portion 42 and the intermediate portion 43 may be specified. However, since the contact portion 41, the connection portion 42, and the intermediate portion 43 are formed of one metallic member, there is no visible boundary. Therefore, an edge 412*a* close to the connection portion 42 in a contact arm 412 is defined as the boundary between the contact portion 41 and the intermediate portion 43 (see FIG. 9). Also, an edge 42*a* close to the contact portion 41 where the width is the same as where the signal line SC1 is connected is taken as the boundary between the intermediate portion 43 and the connection portion 42. The portion having the same width includes a portion having a chamfered corner portion.

The signal contact conductor 40 may be bent at the boundary between the intermediate portion 43 and the connection portion 42 (in the vicinity of the boundary) so that the first main surface 421 (the connection surface) has a recess to the first main surface 431 (the intermediate surface).

An extension portion 44 is a planar portion that extends in a direction opposite to the direction from the contact base 411 to the intermediate portion 43. An extension portion 45 is a planar portion that extends in a direction opposite to the direction from the connection portion 42 to the intermediate portion 43. The extension portion 44, 45 functions as a holding margin by the housing 50.

Housing

As shown in FIG. 7, the housing 50 holds the signal contact conductor 40 and is contained within the ground contact conductor 60. For example, the housing 50 comprises the first portion 51 and the second portion 52. The first portion 51 (first housing portion) holds the contact portion 41 in the fitting portion 61. For example, the first portion 51 is housed in the fitting portion 61 and holds the contact portion 41 and a portion of the intermediate portion 43 closer to the contact portion 41.

The first portion 51 has a recess 511 for exposing the contact portion 41 to the tip of the fitting portion 61. This allows the contact portion 41 to contact the contact portion 21 of the signal contact conductor 20 in the receptacle connector 2. The outer diameter of the tip portion of the first portion 51 (the portion near the tip of the fitting portion 61) is smaller than the inner diameter of the fitting portion 61. Accordingly, the ground main body 11 of the ground contact conductor 10 may be introduced between the fitting portion 61 and the first portion 51.

The second portion 52 (second housing portion) holds the connection portion 42 between the fitting portion 61 and the clamp portion 64. The second portion 52 protrudes from the first portion 51 in the direction in which the two arm portions 62 extends (the X-direction) and holds the connection portion 42 and a portion of the intermediate portion 43 located near the connection portion 42. As noted above, at least a portion of the second portion 52 is retained by the barrel portion 65 along with the two arm portions 62.

The second portion 52 may be configured to form a cavity between the connection portion 42 and the ground contact conductor 60. For example, the second portion 52 may have the opening OP1 (first opening) configured to expose the first main surface 421 toward the barrel base 651 and the opening OP2 (second opening) configured to expose the second main surface 422 toward the barrel arm 652. The second portion 52 may have the opening for ultrasonic bonding a signal line to the connection portion 42, the opening constituting at least part of the cavity. The second portion 52 may have the opening on both the first main surface 421 side and the opposite side of the first main surface 421. The opening herein refers to the opening exposing at least a portion of the first main surface 421 or the second main face 422 of the connection portion 42 outside the housing 50.

Figure 10:
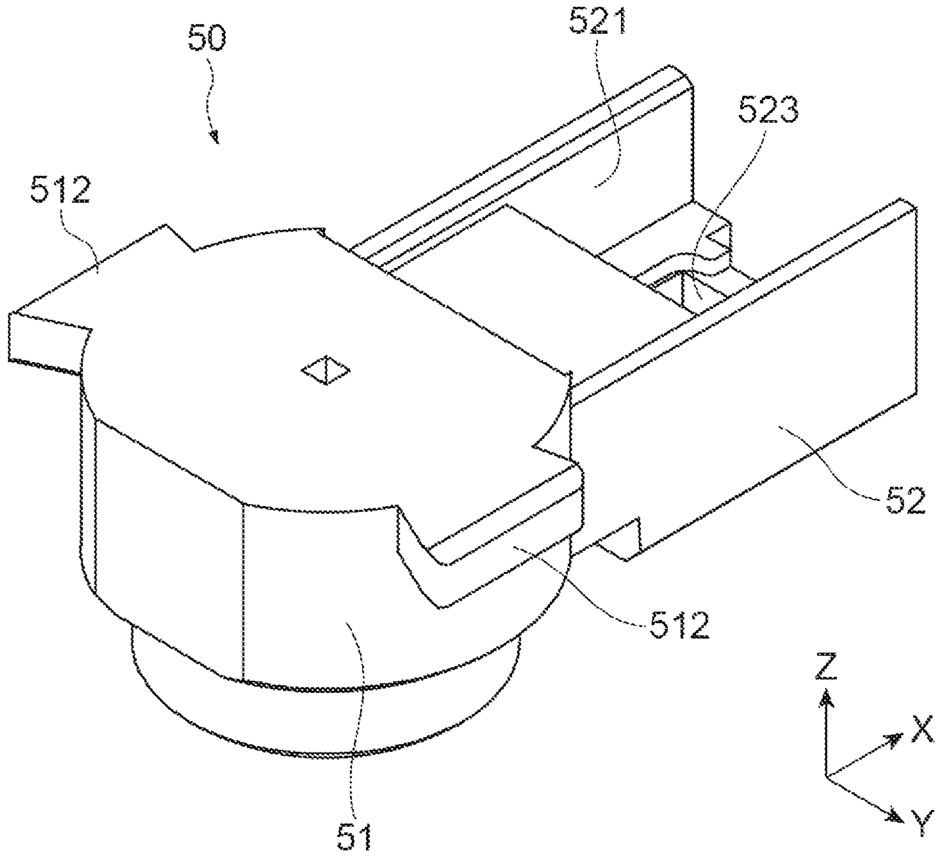
FIG. 10 is a perspective view of an example housing

For example, the second portion 52 has a recess 521 that exposes the first main surface 421 to the barrel base 651 (see FIG. 10). As a result, an opening OP1 is formed in the second portion 52 to expose a part of the first main surface 421 outside the housing 50 (see FIG. 7). The recess 521 is also open to the opposite side of the first portion 51 (towards the base end of the coaxial cable SC) in the second portion 52. The opening OP1 is used to press the signal line SC1 against the first main surface 421 with a tool for ultrasonic bonding. The opening OP1 constitutes a cavity CC1 between the first main surface 421 and the barrel base 651.

Figure 11:
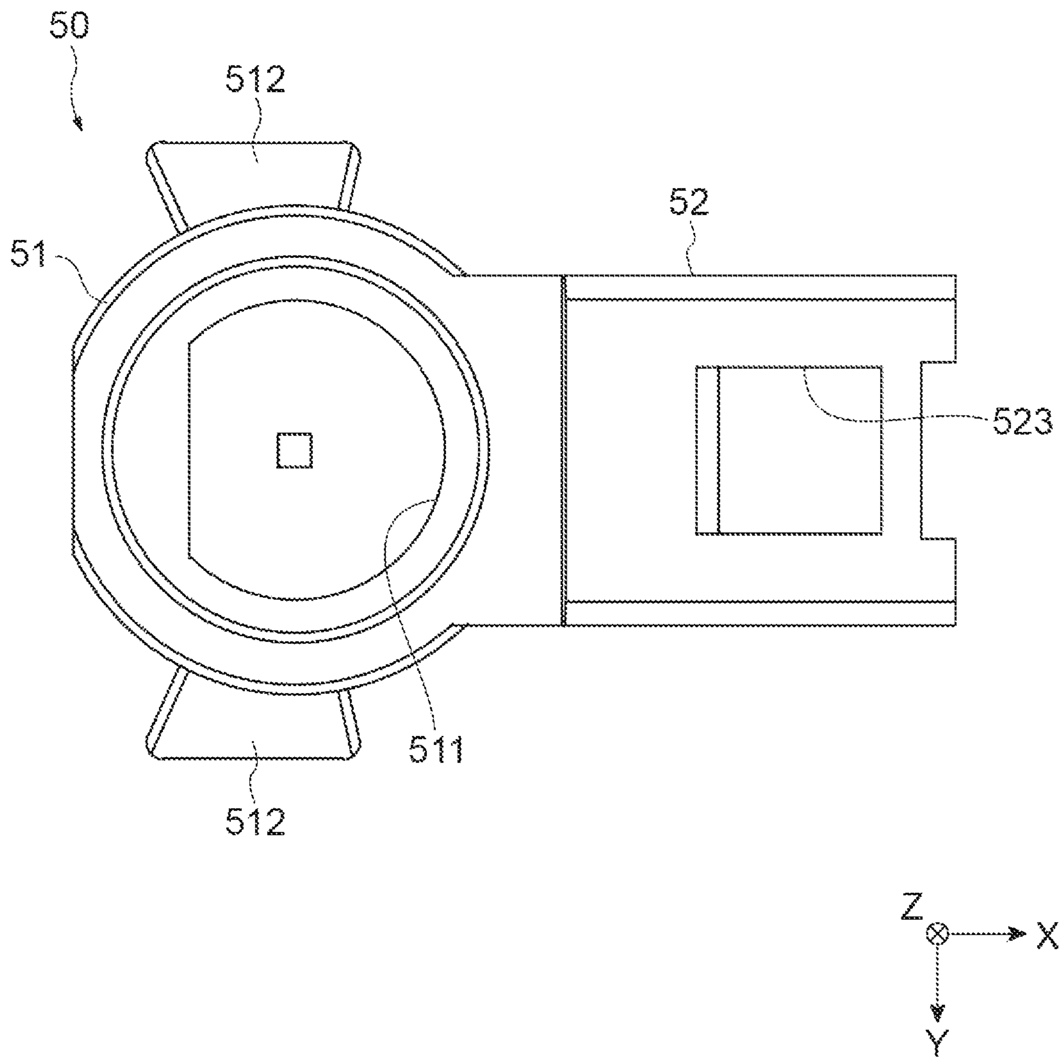
FIG. 11 is a bottom view of the housing of FIG. 10.
Figure 12:
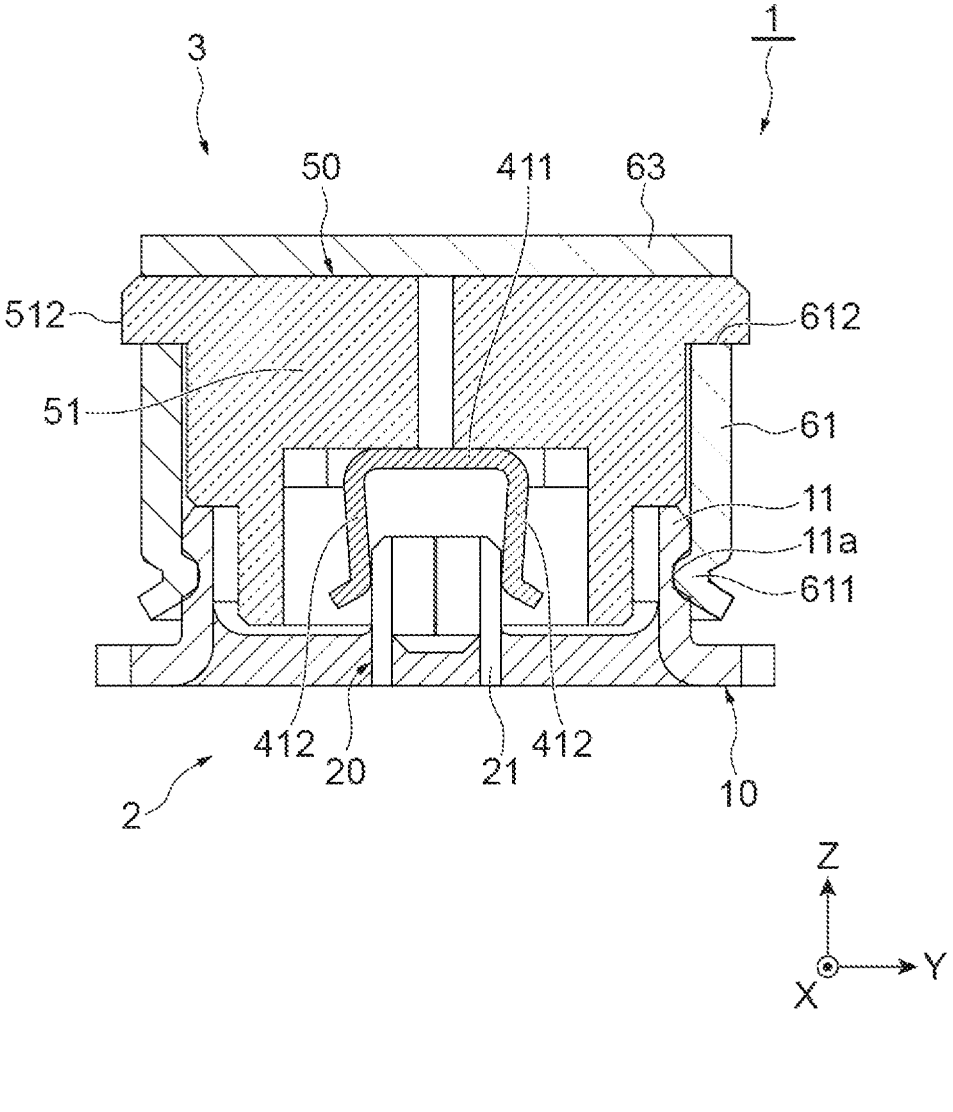
FIG. 12 is a diagram illustrating a fitted state of the connector assembly, and is a cross-sectional view taken along line XII-XII of FIG. 1.

In addition, a through hole 523 exposing the second main surface 422 toward the tip portion of arm portion 62 is formed in a portion of the second portion 52 constituting the bottom surface of the recess 521 (see FIG. 11). This creates an opening OP2 in the second portion 52 that exposes a portion of the second main surface 422 outside the housing 50. The opening OP2 is used to press a tool for supporting the connection portion 42 against the second main surface 422 from the opposite side of the tool for ultrasonic bonding. The opening OP2 constitutes a cavity CC2 between the second main surface 422 and the tip portion of the barrel arm 652.

As shown in FIGS. 10 and 11, the plurality of convex portions 512 aligned with the circumferential direction are provided on the outer periphery of the end portion of the first portion 51 (the portion on the base end side of the fitting portion 61). As described above, each of the convex portions 512 is fitted into each cutout portions 612 of the fitting portion 61 (see FIG. 6). The convex portion 512 fitted into the cutout portion 612 may protrude outward from the periphery of the lid portion 63 described above (see FIG. 12). In some examples, the amount of overhang of the lid portion 63 relative to the perimeter of the fitting portion 61 may be less than the amount of protrusion of the convex portion 512 relative to the perimeter of the fitting portion 61.

Plug Connector Assembly Process

The assembly process of the plug connector 3 will be described. The process may comprise: bringing the signal line SC1 exposed at the first exposing portion TP1, into contact with the connection portion 42; applying ultrasonic waves for ultrasonic bonding to the signal line SC1 in contact with the connection portion 42; placing the first portion 51 in the fitting portion 61; placing the second portion 52 outside the fitting portion 61; holding the second exposing portion TP2 by the clamp portion 64 so that the clamp portion 64 contact the shield SC3 exposed at the second exposing portion TP2, without the ground contact conductor 60 overlapping an outer peripheral surface of the insulating sheath SC4; and holding the second portion 52 and a part of the second exposing portion TP2 by the barrel portion 65. For example, the signal contact conductor 40 is prepared, and the signal contact conductor 40 is set in a mold. Thereafter, an insulating material (for example, an insulating resin) is injected into a mold and cooled and solidified. That is, the housing 50 is prepared by insert molding while the signal contact conductor 40 is maintained. The ground contact conductor 60 is then prepared and the housing 50 is placed in the ground contact conductor 60 so that the convex portions 512 fits into the cutout portions 612 of the fitting portion 61, respectively. The signal contact conductor 40 and the ground contact conductor 60 can be produced by punching a metallic member having a predetermined shape from a thin metallic plate and subjecting the metallic member to plastic working such as bending. As described above, the ground contact conductor 60 is in a state in which the first portion 60A and the second portion 60B are connected by the connection portion 60C with the lid portion 63 along the central axis of the fitting portion 61. Neither the two barrel arms 652 nor the two clamp arms 642 is bent.

The signal line SC1 is then ultrasonically bonded to the first main surface 421 in the connection portion 42 in the opening OP1 in the housing 50. In particular, the tool for supporting the connection portion 42 is inserted into the opening OP2 and pressed against the second main surface 422, and the tool for ultrasonic bonding is inserted into the opening OP1 to press the signal line SC1 against the first main surface 421. In this state, ultrasonic waves are applied to the signal line SC1 by the tool for ultrasonic bonding to cause melting of the plating or the like, thereby bonding the signal line SC1 to the first main surface 421.

Next, the connection portion 60C is folded and the lid portion 63 blocks the base end of the fitting portion 61. At this time, the second portion 52 of the two arm portions 62 and the housing 50 are housed in the two barrel arms 652, and the held portion of the terminal portion TP is housed in the two clamp arms 642.

The two clamp arms 642 is then flexed to enclose the held portion of the terminal portion TP with the clamp base 641, and the two barrel arms 652 are flexed to enclose the two arm portions 62 and the second portion 52 with the barrel base 651. This completes the plug connector 3 assembly process.

Next, an example operation of the connector assembly 1 described above will be described.

Receptacle Connector

In the receptacle connector 2 contained in the connector assembly 1, the ground contact conductor 10 has the tubular ground main body 11 extending along the central axis C, which is a predetermined axis, and the external terminal portion 12 provided in the end edge on one side of the ground main body 11 along the central axis C direction. Also, in the receptacle connector 2, the signal contact conductor 20 has the contact portion 21 extending inwardly of the ground main body 11 in the central axis C direction and in contact with the signal contact conductor of the plug connector 3 (the contact conductor of the mate connector) and the substantially planar conductor portion 22 extending from the end edge of one of the contact portion 21 in the central axis C direction (the end edge on the same side of the external terminal portion 12 provided in the ground main body 11) to the extending direction transverse to the central axis C direction. And, the conductor portion 22 has its pair of main surfaces extending across the central axis C direction and its width vary depending on the location of the extending direction. In radio frequency range, high precision impedance matching in the connector is required. As in the above-described receptacle connector 2, by adopting a structure in which the width of the conductor portion 22 varies depending on the position in extending direction, the characteristic impedance may be adjusted and the variation of the characteristic impedance may be reduced. In addition, since the pair of main surfaces extends across the axis direction, the receptacle connector 2 can be reduced in height. The width of the conductor portion 22 having the pair of main faces extending across the axis direction varies in accordance with the position of the extending direction, thereby favorably adjusting the characteristic impedance.

In addition, the region 221*a* which is the minimum portion in which the width of the conductor portion 22 is minimum is provided at a position closest to the contact portion 21 in the conductor portion 22, and the second region 222 including the maximum portion in which the width of the conductor portion 22 is maximum is provided at a position away from the minimum portion in the extending direction. Then, the width of the conductor portion 22 gradually increases from the minimum portion toward the maximum portion. Increasing the width of the conductor portion 22 closest to the contact portion 21 in the conductor portion 22 may increase the variation amount of the characteristic impedance because the characteristic impedance is smaller under the influence of the ground contact conductor 10. In contrast, minimizing the width of the conductor portion 22 of the region as described above can reduce the variation of the characteristic impedance to the contact portion 21. In addition, the maximum portion where the width of the conductor portion 22 is the largest is set apart from the minimum portion, and the width gradually changes, so that variation of the characteristic impedance derived from variation of the width of the conductor portion 22 can be reduced. The variation of the width for achieving the above effect may be stepwise or gradual.

The maximum portion of the conductor portion 22 is provided with the through hole 225, and a part of the housing 30 enters the through hole 225. In the region in which is the width of the conductor portion 22 is large, there is a potential for a decrease in the characteristic impedance. On the other hand, since the through hole 225 is provided in the maximum portion of the width, the decrease in the characteristic impedance in the region is suppressed. Further, since a part of the housing 30 enters the through hole 225, the adhesion between the housing 30 and the signal contact conductor 20 is enhanced.

The through hole 225 is provided at a position overlapping the ground main body 11 of the ground contact conductor 10 when viewed from the central axis C direction. The location where the ground main body 11 of the ground contact conductor 10 and the conductor portion 22 of the signal contact conductor 20 overlap is the region where the two are in close proximity, which can result in deterioration of the characteristic impedance. On the other hand, by providing the through hole 225 in the conductor portion 22, the signal contact conductor 20 in the vicinity of the ground main body 11 of the ground contact conductor 10 can be reduced, so that the decrease in the characteristic impedance is suppressed.

The receptacle connector 2 also includes the signal contact conductor 20, the ground contact conductor 10, and the housing 30 which integrates and insulates the signal contact conductor 20 and the ground contact conductor 10. The ground contact conductor 10 has a cylindrical ground main body 11 extending along the predetermined central axis C and the external terminal portion 12 provided in the end edge on one side in the central axis C direction of the ground main body 11. The signal contact conductor 20 includes the contact portion 21 which has a generally cylindrical shape extending inwardly of the ground main body 11, having the slit 211 extending in the central axis C direction and in contact with the signal contact conductor 40 of the plug connector 3 (the mate connector) and the conductor portion 22 extending from the end edge of one of the contact portion 21 in the central axis C direction (the end edge on the same side of the ground main body 11 as the external terminal portion 12 is provided) to the extending direction transverse to the central axis C direction. The housing 30 then comes into contact with the end edge of the contact portion 21 of the signal contact conductor 20 in which the conductor portion 22 is located and penetrates between the contact portion 21 and the ground main body 11 and inside the contact portion 21. The height of the surface of the housing 30 along the central axis C direction inside the contact portion 21 being closer to the bottom facing the printed circuit board PB of the housing 30 than the height of the surface along the central axis C direction between the contact portion 21 and the ground main body 11. Accordingly, even if a burr or the like is generated by the material constituting the housing 30 when the housing 30 is formed by insert molding as described above, the risk that the burr affects the contact with the counterpart contact conductor may be reduced. Therefore, a poor connection resulting from the molding of the housing 30 may be avoided.

In addition, in at least a part of the region continuing from the slit 211 between the contact portion 21 and the ground main body 11, a height of the surface along the central axis C direction of the housing 30 may be the same as a height of the surface along the central axis C direction inside the contact portion 21. When the housing 30 is formed by insert molding, a material constituting the housing, such as a resinous material, moves in and out of the slit 211 during molding. Therefore, burrs or the like may be generated due to the material moving inside and outside the slit 211. By setting the height of the housing 30 of the region continuing from the slit 211 to the same height as the inside of the contact portion 21, even if burrs or the like are generated around the slit 211, the risk that the burrs affect the contact with the signal contact conductor 40 of the plug connector 3 (the counterpart signal contact conductor) may be reduced. Therefore, a poor connection resulting from the molding of the housing 30 may be avoided. In addition, when the receptacle connector 2 is manufactured, after the signal contact conductor 20 is set in the mold, the parts in the mold are brought into contact with the outside of the slit 211 when the insulating material is injected, so that the signal contact conductor 20 can be accurately positioned in the mold. Further, since the parts in the mold are brought into contact with the outside of the slit 211, the insulating material can be prevented from leaking from the part.

In the end edge where the conductor portion 22 of the contact portion 21 in the signal contact conductor 20 is provided, the cutout portion 213 is provided continuously to the conductor portion 22, and the housing 30 between the contact portion 21 and the ground main body 11 and the housing 30 inside the contact portion 21 are continuous in the cutout portion 213. The continuity of the housing 30 between the contact portion 21 and the ground main body 11 and inside the contact portion 21 through the cutout portion 213 enhances the adherence of the housing 30 to the ground contact conductor 10 and the signal contact conductor 20. Therefore, damage to the receptacle connector 2 can be prevented.

Plug Connector

In the plug connector 3, the ground contact conductor 60 comprises: a fitting portion 61 configured to fit to the ground contact conductor 60 of the mate connector 2; and a clamp portion 64 configured to hold a second exposing portion TP2 of the coaxial cable SC (a portion of the terminal portion TP of the coaxial cable SC where a part of the insulating sheath SC4 has been removed) to contact the shield SC3 exposed at the second exposing portion TP2, without the ground contact conductor 60 overlapping an outer peripheral surface of the insulating sheath SC4. The clamp portion 64 is located at the end of the ground contact conductor 60 farthest from the fitting portion 61. The second exposing portion TP2 is adjacent to a first exposing portion TP1 formed at the terminal portion TP where the signal line SC1 is exposed. When a part of the ground contact conductor 60 faces the shield SC3 via the insulating sheath SC4, the stability of the characteristic impedance in the transmission route of the radio frequency signal decreases due to the capacitance of the part. In contrast, according to the plug connector 3, since the clamp portion 64 that contacts the shield SC3 is located at the farthest end from the fitting portion 61, the portion of the ground contact conductor 60 that faces the shield SC3 through the insulating sheath SC4 is reduced. Therefore, the stability of the characteristic impedance in the transmission route of the radio frequency signal may be improved.

The ground contact conductor 60 may further comprise a barrel portion 65 configured to hold the housing 50 between the fitting portion 61 and the clamp portion 64, and the barrel portion 65 may be configured to further hold the dielectric layer SC2 and the shield SC3. In the configuration in which the clamp portion 64 is located at the end farthest from the fitting portion 61, it is difficult to separately provide a portion that holds the coaxial cable SC from the outside of the insulating sheath SC4 (hereinafter, referred to as an "outer skin clamp"). In contrast, according to the configuration in which the barrel portion 65 further holds the dielectric layer SC2 and the shield SC3 between the housing 50 and the clamp portion 64, the barrel portion 65 can reinforce the connection portion between the ground contact conductor 60 and the coaxial cable SC instead of the outer skin clamp.

The ground contact conductor 60 may further comprise a holding claw portion 653 projecting inwardly from the barrel portion 65 to push the shield SC3 toward the dielectric layer SC2. In some examples, the reinforcing effect of the connection portion of the ground contact conductor 60 and the coaxial cable SC by the barrel portion 65 can be further enhanced. In addition, the barrel portion 65 and the shield SC3 can be conducted more firmly, and the characteristic impedance can be further improved.

The holding claw portion 653 may be located closer to the clamp portion 64 between the housing 50 and the clamp portion 64. For example, the holding claw portion 653 may be located between the second portion 52 and the clamp portion 64 and located closer to the clamp portion 64. Accordingly, the reinforcing effect can be further enhanced by the holding claw portion 653, and the barrel portion 65 and the shield SC3 can be more firmly conducted.

The housing 50 may comprise openings OP1, OP2 for ultrasonically bonding the signal line SC1 to the connection portion 42. According to the configuration in which the signal line SC1 is ultrasonically bonded to the connection portion 42, the posture of the signal line SC1 after bonding is more stable than after soldering or the like, thereby improving the stability in characteristic impedance. In addition, since thermal damage to the dielectric layer SC2 at the time of bonding is smaller than that in soldering or the like, the tip of the dielectric layer SC2 can be brought close to connection portion 42 by shortening the exposed length of the signal line SC1. Therefore, the holding margin of the dielectric layer SC2 and the shield SC3 by the barrel portion 65 can be increased, and the reinforcing effect by the barrel portion 65 can be further enhanced.

The ground contact conductor 60 may further comprise a lid portion 63 configured to close one end of the fitting portion 61 without overlapping with an outer peripheral surface of the fitting portion 61. Accordingly, the structure in which the lid portion 63 does not overlap the outer peripheral surface of the fitting portion 61 further reduces the locations where capacitance is likely to be generated. Therefore, the stability of the characteristic impedance in the transmission route of the radio frequency signal may be improved.

In the signal contact conductor 40, the width of the intermediate portion 43 may vary depending on the location between the contact portion 41 and the connection portion 42 to suppress variation of the characteristic impedance between the signal contact conductor 40 and the ground contact conductor 60 depending on the location between the contact portion 41 and the connection portion 42. Accordingly, the variation of the characteristic impedance from the connection portion 42 to the contact portion 41 is suppressed by the width in the intermediate portion 43. Therefore, the stability of the characteristic impedance in the transmission route of the radio frequency signal may be improved.

The portion of the intermediate portion 43 located in the gap GP2 between the fitting portion 61 and the barrel portion 65 may be provided with the widened portion 433 having the width greater than both the portion of the intermediate portion 43 located in the fitting portion 61 and the portion located in the barrel portion 65. Between the fitting portion 61 and the barrel portion 65, the amount of metals on the ground contact conductor 60 side is smaller than in the barrel portion 65 or the like. Thus, the characteristic impedance between the signal contact conductor 40 and the ground contact conductor 60 tends to be higher than in the barrel portion 65, etc. On the other hand, by providing the widened portion 433 in the intermediate portion 43, the characteristic impedance can be prevented from increasing in the pathway from the connection portion 42 to the contact base 411.

The width of the connection portion 42 may be larger than the width of the intermediate portion 43, and the housing 50 may be configured to make the cavities CC1 and CC2, between the connection portion 42 and the ground contact conductor 60. Increasing the width of the connection portion 42 may improve the workability of connecting the signal line SC1 to the connection portion 42. On the other hand, the larger the width in the connection portion 42, the lower the characteristic impedance in the connection portion 42. In contrast, the housing 50 makes the cavities CC1 and CC2, between the connection portion 42 and the ground contact conductor 60, thereby lowering the dielectric constant between the connection portion 42 and the ground contact conductor 60. Therefore, the decrease in the characteristic impedance due to the increase in the width of the connection portion 42 is suppressed. Therefore, the workability of connection of the signal line SC1 may be achieved and any unintended variation of the characteristic impedance may be avoided.

The openings OP1 and OP2 for ultrasonic bonding of the signal line SC1 to the connection portion 42 may constitute at least part of the cavity CC1 and CC2. The openings OP1 and OP2 may contribute to both suppression of variation of the characteristic impedance and improvement of workability of ultrasonic bonding. Therefore, the workability of connection of the signal line SC1 may be achieved and any unintended variation of the characteristic impedance may be avoided.

The connection portion 42 may have the first main surface 421 for connecting the signal line SC1, the intermediate portion 43 may have the first main surface 431 connected to the first main surface 421, and the signal contact conductor 40 may be bent at the interface of the intermediate portion 43 and the connection portion 42 such that the first main surface 421 is recessed with respect to the first main surface 431. Since the balance between the interval between the connection portion 42 and the ground contact conductor 60 and the interval between the signal line SC1 connected to the connection portion 42 and the ground contact conductor 60 is adjusted, variation of the characteristic impedance can be more reliably suppressed.

Other Example Plug Connectors

An example plug connector 3A will be described with reference to FIGS. 13 and 14.

Figure 13:
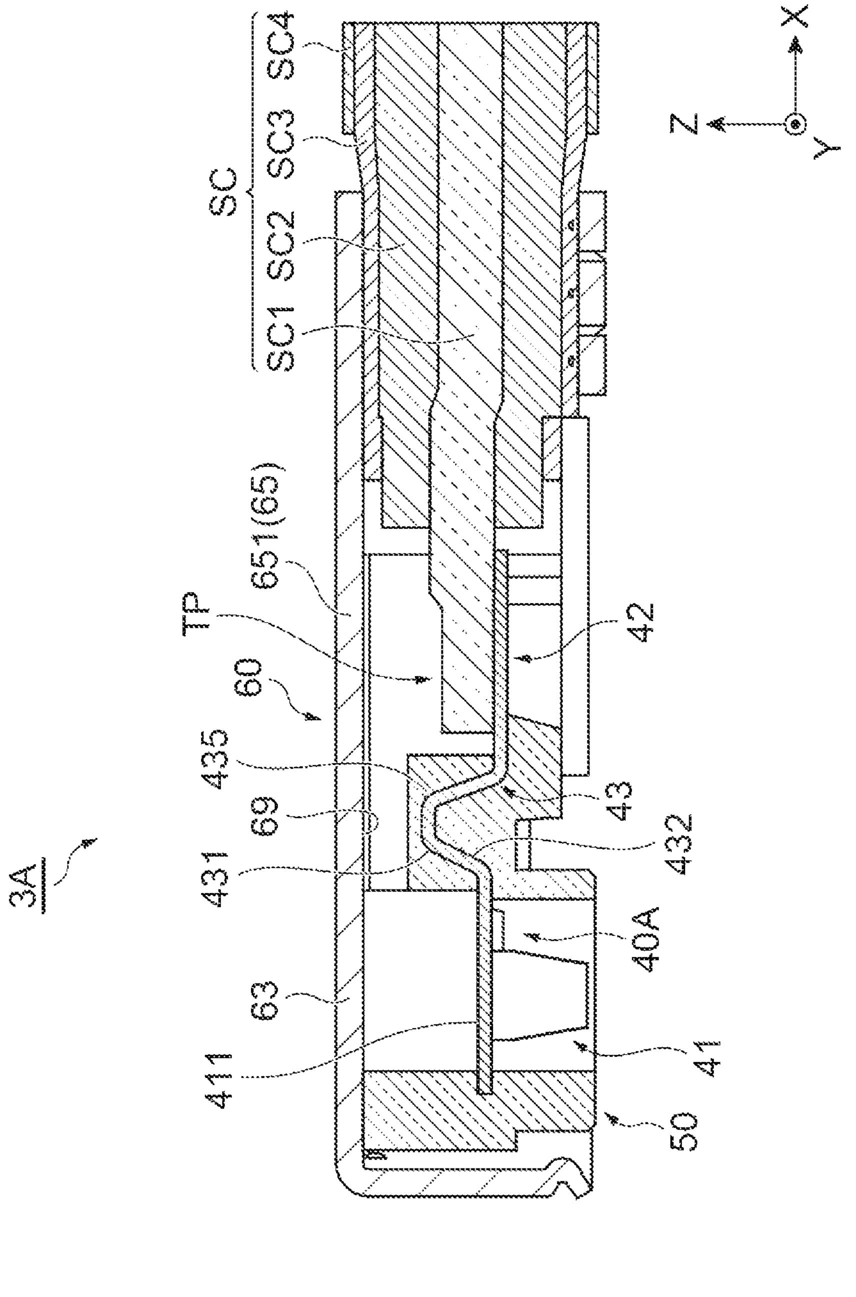
FIG. 13 is a cross-sectional view of another example plug connector.

The plug connector 3A comprises a signal contact conductor 40A, the ground contact conductor 60, and the housing 50, which is insulating, as shown in FIG. 13. The plug connector 3A differs from the plug connector 3 in the shape of the signal contact conductor 40A. The plug connector 3A, like the plug connector 3, is attached to the terminal portion TP where the signal line SC1 and the shield SC3 are partially exposed. In the plug connector 3A installed in the terminal portion TP, the signal contact conductor 40A also communicates with the signal line SC1.

Figure 14:
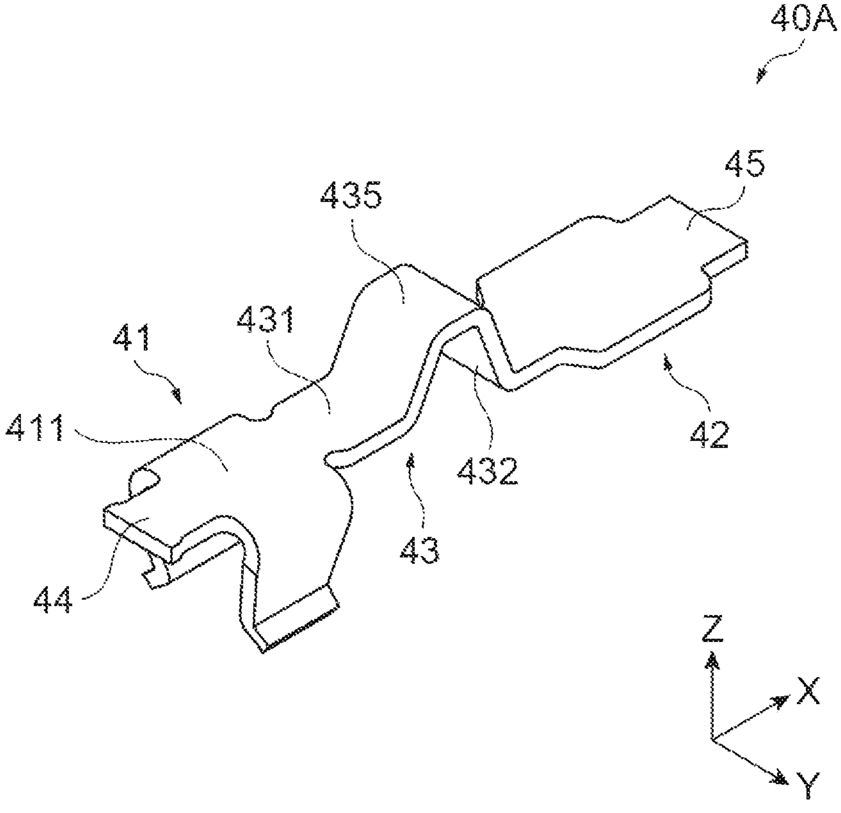
FIG. 14 is a perspective view of an example signal contact conductor.

The signal contact conductor 40A of the plug connector 3A, like the signal contact conductor 40, has the contact portion 41, the connection portion 42, the intermediate portion 43, and the extension portions 44 and 45 (see FIG. 14). The shapes of the contact portion 41, the connection portion 42, and the extension portion 44 and 45 in the signal contact conductor 40A are the same as the signal contact conductor 40, but the shape of the intermediate portion 43 is different from the signal contact conductor 40.

The intermediate portion 43 of the signal contact conductor 40A has the first main surface 431 and the second main surface 432 opposite to the first main surface 431 in the Z direction, as shown in FIG. 13. In addition, the distance of the intermediate portion 43 from the ground contact conductor 60 in the Z direction varies along the direction (the X direction) connecting the contact portion 41 and the connection portion 42. In particular, the intermediate portion 43 has a convex portion 435 such that the first main surface 431 is convex along the direction (the X direction) connecting the contact portion 41 and the connection portion 42. The convex portion 435 is shaped to be concave in the second main surface 432. As a result, as shown in FIG. 13, the signal contact conductor 40A has a shorter distance in the Z direction from the ground contact conductor 60 than the contact base 411, which is the base portion of the contact portion 41 in the convex portion 435. The convex portion 435 faces the region connecting the lid portion 63 in the ground contact conductor 60 and the barrel base 651 in the barrel portion 65. The distance between an opposing surface 69 in the ground contact conductor 60 and the first main surface 431 in the convex portion 435 of the signal contact conductor 40A is shortened compared to the contact base

411, which is the base portion of the contact portion 41. The convex portion 435 is not provided with unevenness or the like in the width direction (the Y direction) of the intermediate portion 43, and the distance in the Y direction from the ground contact conductor 60 is uniform.

The convex portion 435 of the intermediate portion 43 is set to suppress variation of the characteristic impedance between the signal contact conductor 40A and the ground contact conductor 60 depending on the position in the direction (the X direction) connecting the contact portion 41 and the connection portion 42. When the distance between the intermediate portion 43 and the ground contact conductor 60 in the Z direction is constant, the characteristic impedance between the intermediate portion 43 and the ground contact conductor 60 may vary depending on the position in the direction (the X direction) connecting the contact portion 41 and the connection portion 42. In this regard, in the signal contact conductor 40 of the example plug connector 3 described above, the variation of the characteristic impedance is suppressed by changing the width of the intermediate portion 43. On the other hand, in the plug connector 3A, the variation of the characteristic impedance is suppressed by adjusting the distance in the Z direction between the intermediate portion of the signal contact conductor 40A and the ground contact conductor 60. As an example, in a position where the characteristic impedance is high due to the relationship with the ground contact conductor 60, the characteristic impedance is adjusted to be low by reducing the distance in the Z direction between the first main surface 431 of the intermediate portion 43 and the ground contact conductor 60 compared to a position where the characteristic impedance is low by providing the convex portion 435.

Thus, the intermediate portion 43 of the signal contact conductor 40A in the plug connector 3A may vary in Z direction distance from the ground contact conductor along the direction connecting the contact portion 41 and the connection portion 42 (the X direction). With this configuration, variation in the characteristic impedance from the contact portion 41 to the connection portion 42 is suppressed by variation in the distance in the Z direction between the intermediate portion 43 (particularly the first main surface 431) and the ground contact conductor 60. Therefore, the stability of the characteristic impedance in the transmission route of the radio frequency signal may be improved.

Also, having the convex portion 435 at a shorter distance in the Z direction from the ground contact conductor 60 than the base portion of the contact portion 41 can reduce the characteristic impedance in the convex portion 435. Therefore, the convex portion 435 is effective for adjustment for the purpose of lowering the characteristic impedance.

Figure 15:
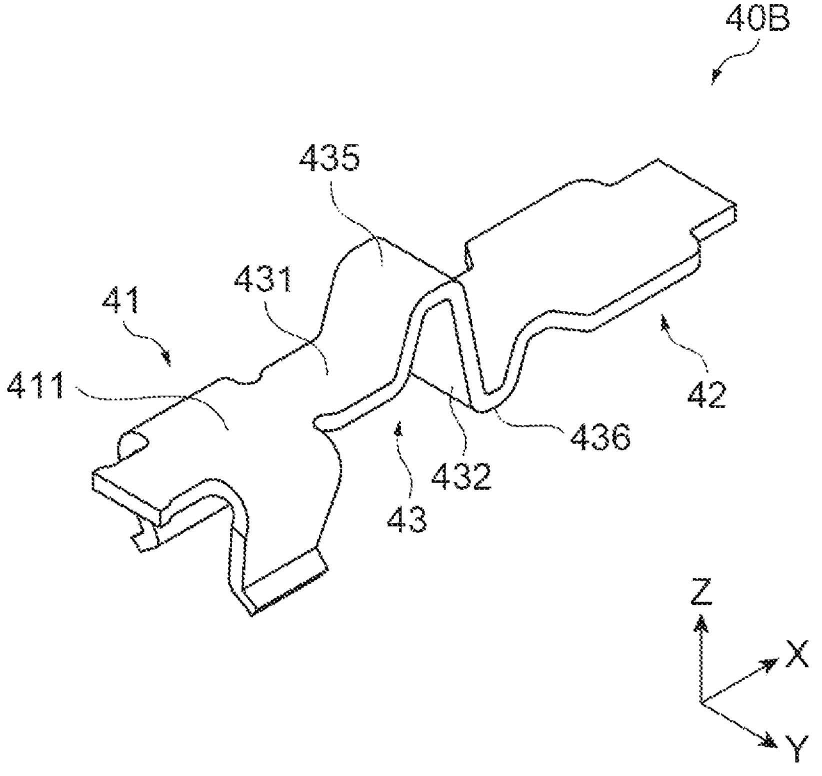
FIG. 15 is a perspective view of another example signal contact conductor.

Contrary to the convex portion 435, it is also effective for the adjustment of the characteristic impedance to provide the recess such that the first main surface 431 has a concave shape and the second main surface 432 has a convex shape along the direction (the X direction) connecting the contact portion 41 and the connection portion 42. A signal contact conductor 40B shown in FIG. 15 has a recess 436 between the convex portion 435 and the connection portion 42. In the recess 436, the distance in the Z direction between the first main surface 431 and the ground contact conductor 60 is increased compared to the contact base 411, which is the base portion of the contact portion 41. Thus, if one has the recess 436 at a greater distance in the Z direction from the ground contact conductor 60 than the base portion of the contact portion 41, the characteristic impedance can be higher in the recess 436. Therefore, the recess 436 is effective for adjustment for the purpose of raising the characteristic impedance.

Figure 16:
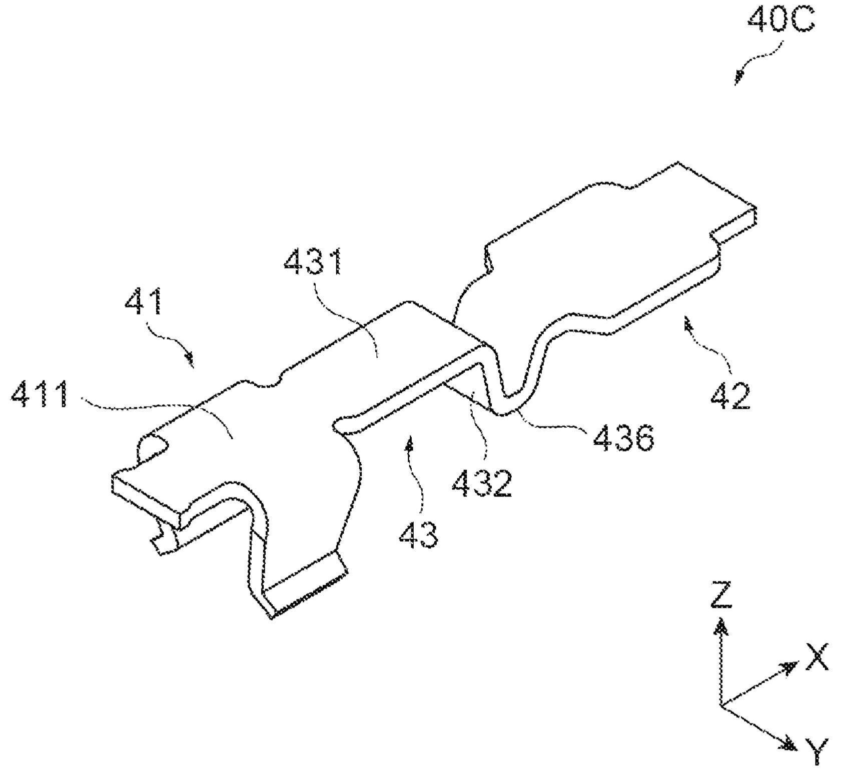
FIG. 16 is a perspective view of another example signal contact conductor.

In a signal contact conductor 40C shown in FIG. 16, only the recess 436 is provided in the intermediate portion 43. In this manner, only the recess 436 may be provided in order to suppress the variation of the characteristic impedance.

In addition, in the signal contact conductors 40A to 40C, the width (the dimension along the Y direction) in intermediate portion 43 is uniform along the direction (the X direction) connecting the contact portion 41 and the connection portion 42, but the convex portion 435 or the recess 436 can adjust the distance in the Z direction from the ground contact conductor 60. Thus, in the signal contact conductors 40A to 40C, the characteristic impedance can be adjusted without changing the width of the intermediate portion 43.

Figure 17:
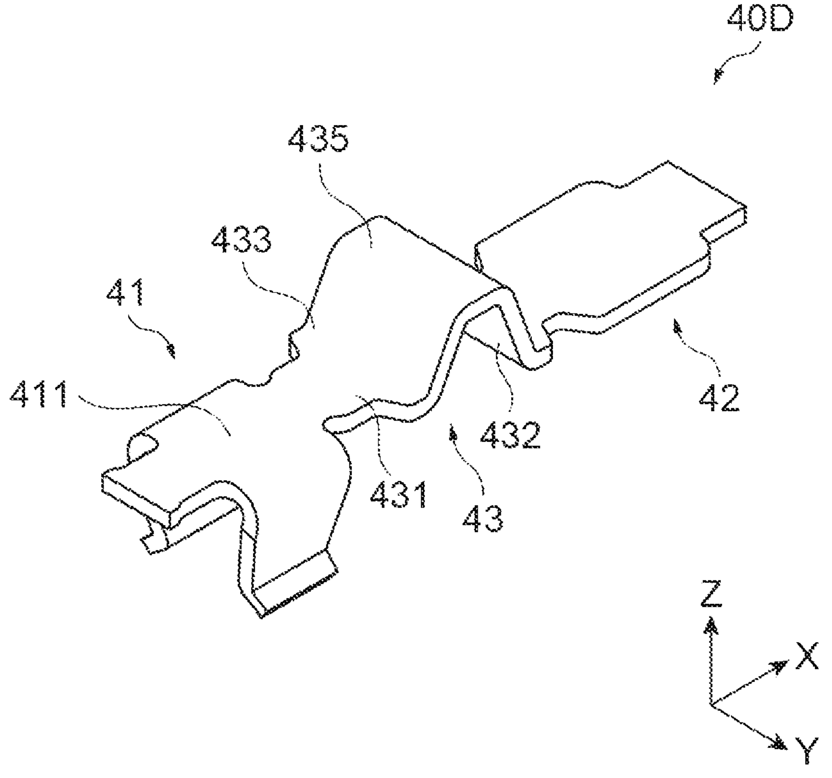
FIG. 17 is a perspective view of another example signal contact conductor.

On the other hand, like the plug connector 3 described above, the adjustment of the characteristic impedance by changing the width (along the Y direction) of the intermediate portion 43 may be combined with the characteristic impedance by providing the convex portion 435 or the recess 436. In a signal contact conductor 40D shown in FIG. 17, the convex portion 435 is provided in the intermediate portion 43. The intermediate portion 43 is also provided with the widened portion 433 whose width (along the Y direction) is greater than that of both the portion of the intermediate portion 43 located in the barrel portion 65 and the portion located in the fitting portion 61. In the signal contact conductor 40D, since the widened portion 433 and the convex portion 435 are overlapped, the convex portion 435 is considered to have a so-called wide width shape.

Figure 18:
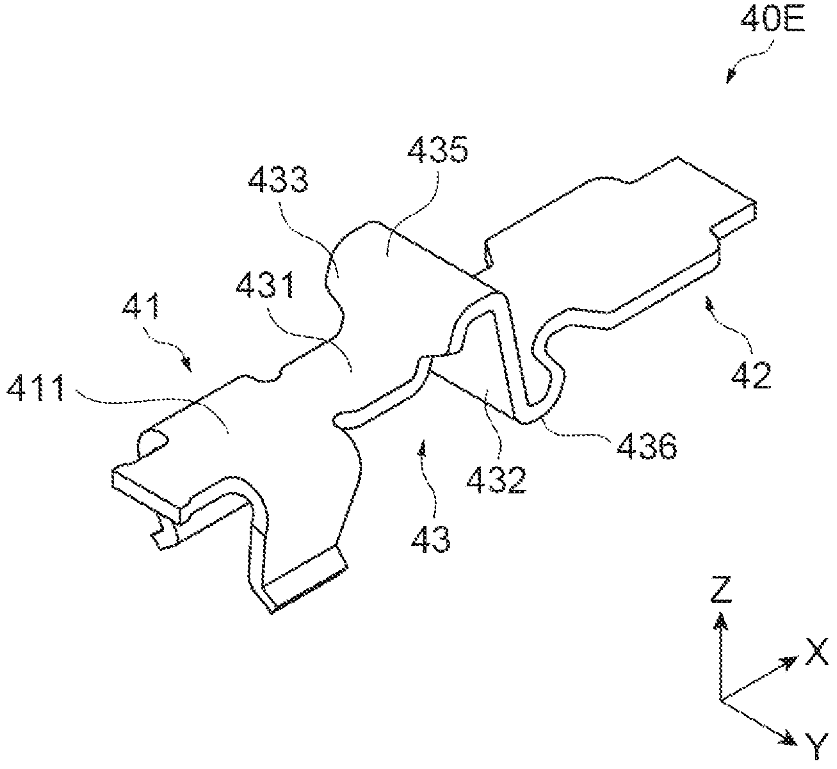
FIG. 18 is a perspective view of another example signal contact conductor.
Figure 19:
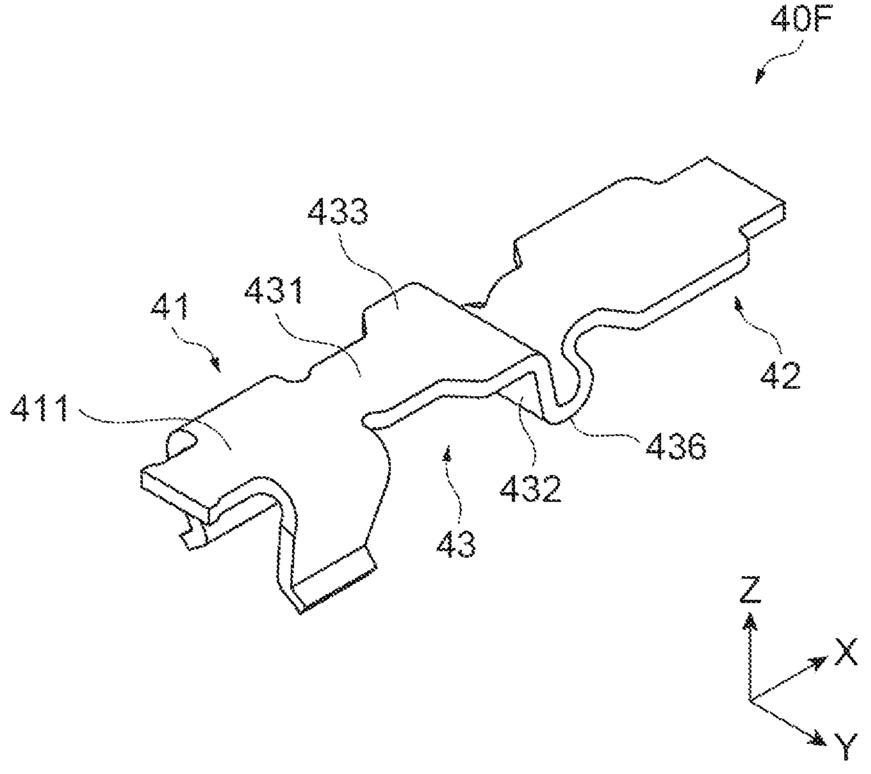
FIG. 19 is a perspective view of another example signal contact conductor.

In a signal contact conductor 40E shown in FIG. 18, the intermediate portion 43 is provided with the convex portion 435 and the recess 436. The intermediate portion 43 is also provided with the widened portion 433 and the widened portion 433 overlaps with the convex portion 435 and the recess 436. Therefore, in the signal contact conductor 40E, both the convex portion 435 and the recess 436 have the so-called wide width shape. Further, in a signal contact conductor 40F shown in FIG. 19, the recess 436 is provided in the intermediate portion 43. The intermediate portion 43 is provided with the widened portion 433, and the widened portion 433 overlaps with the recess 436. Therefore, in the signal contact conductor 40F, both the convex portion 435 and the recess 436 have the so-called wide width shape.

Thus, adjustment of the characteristic impedance by changing the width (along the Y direction), such as by providing the widened portion 433, can be used in conjunction with the characteristic impedance by changing the distance in the Z direction from the ground contact conductor 60, such as by providing the convex portion 435 or the recess 436. That is, by adopting a configuration in which at least one of the area and the distance of the signal contact conductor facing the ground contact conductor 60 varies according to the position between the contact portion 41 and the connection portion 42 so as to suppress the variation of the characteristic impedance between the signal contact conductor 40 and the ground contact conductor 60 in accordance with the position between the contact portion 41 and the connection portion 42, the stability of the characteristic impedance in the transmission route of the radio frequency signal can be improved.

The positions where the convex portion 435 and the recess 436 are provided can be changed variously in consideration of variations in the characteristic impedance. Also, for the convex portion 435 and the recess 436, the difference in distance in the Z direction from the ground contact conductor 60 as compared to the contact base 411, which is the base portion of the contact portion 41, or as compared to the major portion of the intermediate portion 43, can be varied variously. The lengths of the convex portion 435 and the recess 436 along the direction (the X direction) connecting the contact portion 41 and the connection portion 42, and the lengths of the convex portion 435 and the recess 436 in the Z direction can also be changed variously. The positional relationship with the widened portion 433 can also be changed variously.

Although certain procedures or operations are described herein as being performed sequentially or in a particular order, in some examples one or more of the operations may be performed in a different order, in parallel, simultaneously with each other, or in an overlapping manner. Additionally, in some examples, one or more of the operations may be optionally performed or, in some cases, omitted altogether.

We claim all modifications and variations coming within the spirit and scope of the subject matter claimed herein.

As described above, the present disclosure includes the following configurations in another aspect.

[A1]

A connector comprising a signal contact conductor and a ground contact conductor, and an insulating housing between the signal contact conductor and the ground contact conductor, the connector configured to be mounted in a circuit board and fit to a mate connector, wherein the ground contact conductor comprises:

a tubular main body extending along an axis;

an external terminal portion provided in an end edge of the main body in an axis direction along the axis, and wherein the signal contact conductor comprises:

a contact portion extending along the axis direction inside the main body and configured to contact a signal contact conductor of the mate connector; and a substantially planar conductor portion extending from an end edge of the contact portion in the axis direction along an extending direction intersecting the axis direction, and wherein in the conductor portion, a width of its pair of main surfaces varies depending on a position in the extending direction.

[A2]

The connector according to item A1, wherein the width of the conductor portion is at a minimum width in a first position connecting to the contact portion, gradually increases away from the contact portion, and is at a maximum width at a second position away from the contact portion.

[A3]

The connector according to item A2, wherein the conductor portion further comprises a maximum portion extending further from the second position at the maximum width, the maximum portion is provided with an a through hole, and a portion of the housing penetrates into the through hole.

[A4]

The connector according to item A3, wherein the through hole is disposed at a position overlapping the main body when viewed from the axis direction.

[A5]

The connector according to item A2, wherein a distance from the second position to the main body is less than a distance from the second position to the contact portion.

[A6]

The connector according to item A5, wherein the second position is located between the main body and the contact portion.

[A7]

The connector according to item A5 or A6, wherein the conductor portion further comprises an intermediate portion extending from the first position to the second position at an intermediate width that is greater than the width at the first position and less than the width in the second position.

[A8]

The connector according to item A7, wherein between the intermediate portion and the first position, and between the intermediate portion and the second position, a portion is formed in which the width gradually becomes larger as it goes away from the contact portion.

[A9]

The connector according to any one of items A5 to A8, wherein the conductor portion further comprises a maximum portion extending further from the second position at the maximum width, wherein most of the maximum portion is located outside the main body.

[A10]

The connector according to item A9, wherein the external terminal portion comprises a pair of terminal portions, wherein the pair of terminal portions extend in opposite directions from the end edge of the main body along a first direction, wherein each of the pair of terminal portions extends in the same direction from the end edge of the main body along a second direction perpendicular to the first direction, and the maximum portion is located between the pair of the terminal portions outside the main body.

[A11]

The connector according to item A10, wherein a distance between the pair of the terminal portions outside the main body gradually increases away from the contact portion.

[A12]

The connector according to item A10 or A11, wherein the housing extends between the pair of the terminal portions to hold the ground contact conductor and the signal contact conductor both within the main body and outside the main body.

[A13]

The connector according to item A12, wherein the contact portion has a tubular shape along the axis direction, and wherein the housing also formed into the contact portion.

[A14]

The connector according to item A13, wherein the portion of the housing located within the contact portion and the portion located outside the contact portion are connected at a position adjacent to the first position.

[A15]

The connector according to item A14, wherein a slit along the axis direction is formed in a portion of the contact portion located opposite the first position.

[A16]

The connector according to item A15, wherein the housing has a surface facing an interior space of the main body, and a portion of the surface located within the contact portion is recessed relative to a portion located outside the contact portion.

[A17]

The connector according to item A16, wherein a recess is formed in a portion of the surface that contacts the slit from outside the contact portion.

[A18]

The connector according to item A16 or A17, wherein each of the pair of terminal portions has an inclined portion contacting the housing from a direction opposite to a direction toward which the surface is directed, outside the main body.

[A19]

The connector according to any one of items A10 to A18, wherein the signal contact conductor has an end portion extending further from the maximum portion to exit between the pair of terminal portions.

[A20]

The connector according to item A19, wherein the width of the end portion is less than the maximum width.

In another aspect, the present disclosure includes the following configurations.

[B1]

A connector configured to be attached to a coaxial cable comprising a signal line, a dielectric layer covering the signal line, a shield covering the dielectric layer, and an insulating sheath covering the shield, the connector comprising:

a signal contact conductor;

a ground contact conductor; and an insulating housing interposed between the signal contact conductor and the ground contact conductor, wherein signal contact conductor comprises:

a contact portion configured to contact a mate signal contact portion of a mate connector; and a connection portion configured to connect the signal line exposed at an exposing portion formed at a terminal portion of the coaxial cable; and an intermediate portion connecting the contact portion and the connection portion, wherein a width of the intermediate portion varies depending on a position in a connecting direction of the contact portion and the connection portion so as to suppress a variation of characteristic impedance between the signal contact conductor and the ground contact conductor depending on the position.

[B2]

The connector according to item B1, wherein the ground contact conductor comprises:

a fitting portion configured to fit to a mate ground contact portion of the mate connector;

a clamp portion configured to hold a second exposing portion of the coaxial cable adjacent to the exposing portion to contact the shield exposed at the second exposing portion; and a barrel portion configured to hold the housing between the fitting portion and the clamp portion, wherein the contact portion is located in the fitting portion and the connection portion is located in the barrel portion, wherein a gap is between the fitting portion and the barrel portion, and wherein the intermediate portion comprises:

a first intermediate portion located within the fitting portion;

a second intermediate portion located within the barrel portion; and a widened portion located in the gap and larger in the width than both the first intermediate portion and the second intermediate portion.

[B3]

The connector according to item B2, wherein the boundary between the first intermediate portion and the widened portion, the boundary between the second intermediate portion and the widened portion are all located between the fitting portion and the barrel portion.

[B4]

The connector according to item B2 or B3, wherein the width of the connection portion is greater than the width of the intermediate portion, and wherein the housing is configured to form a cavity between the connection portion and the ground contact conductor.

[B5]

The connector according to item B4, wherein the connection portion comprises a connection surface for connecting the signal line, wherein the intermediate portion has an intermediate surface connected to the connection surface, wherein the housing is located between the intermediate surface and the connection surface and the ground contact conductor, and wherein the housing has an opening to expose the connection surface toward the ground contact conductor, and to form at least a part of the cavity.

[B6]

The connector according to item B5, wherein the barrel portion comprises a barrel base and a barrel arm configured to sandwich the housing between the barrel arm and the barrel base, wherein the opening exposes the connection surface toward the barrel base, and wherein the housing further comprises a second opening to expose a back surface of the connection surface toward the barrel arm.

[B7]

The connector according to item B6, wherein an opening area of the opening is greater than an opening area of the second opening.

[B8]

The connector according to item B6 or B7, wherein the second opening has a size capable of inserting a supporting tool for supporting the connection portion and the first opening has a size capable of inserting a connection tool for applying ultrasonic waves to the signal line of the first exposing portion when connecting the signal line to the connection surface of the connection portion supported by the supporting tool.

[B9]

The connector according to any one of items B5 to B8, wherein the intermediate surface is covered with the housing.

[B10]

The connector according to item B9, wherein the back surface of the intermediate surface is covered by the housing.

[B11]

The connector according to any one of items B5 to B10, wherein the signal contact conductor is bent at a boundary between the intermediate portion and the connection portion such that the connection surface has a recess to the intermediate surface.

[B12]

A connector configured to be attached to a coaxial cable comprising a signal line, a dielectric layer covering the signal line, a shield covering the dielectric layer, and an insulating sheath covering the shield, the connector comprising:

a signal contact conductor;

a ground contact conductor; and an insulating housing interposed between the signal contact conductor and the ground contact conductor, wherein the signal contact conductor comprises:

a contact portion configured to contact a mate signal contact portion of a mate connector; and a connection portion configured to connect the signal line exposed at an exposing portion formed at a terminal portion of the coaxial cable; and an intermediate portion connecting the contact portion and the connection portion, wherein a distance between the ground contact conductor and the intermediate portion varies depending on a position in a connecting direction of the contact portion and the connection portion so as to suppress variation of characteristic impedance between the signal contact conductor and the ground contact conductor depending on the position.

[B13]

The connector according to item B12, wherein the connection portion comprises a connection surface for connecting the signal line, wherein the intermediate portion has an intermediate surface connected to the connection surface, and wherein the intermediate surface is formed with a convex portion for reducing a distance between the ground contact conductor and the intermediate portion.

[B14]

The connector according to item B13, wherein the ground contact conductor comprises:

a fitting portion configured to fit to a mate ground contact portion of the mate connector;

a clamp portion configured to hold a second exposing portion of the coaxial cable adjacent to the exposing portion to contact the shield exposed at the second exposing portion; and a barrel portion configured to hold the housing between the fitting portion and the clamp portion, wherein the contact portion is located in the fitting portion and the connection portion is located in the barrel portion, wherein a gap is between the fitting portion and the barrel portion, and wherein the convex portion is formed in the gap.

[B15]

The connector according to item B14, wherein a portion of the intermediate surface located between the convex portion and the connection surface is formed with a recess to increase the distance between the ground contact conductor and the intermediate portion.

[B16]

The connector according to item B15, wherein the barrel portion comprises a barrel base and a barrel arm configured to sandwich the housing between the barrel arm and the barrel base, wherein the intermediate surface faces the barrel base.

[B17]

The connector according to item B16, wherein the formation of the recess increases the distance between the intermediate surface and the barrel base and decreases the distance between a back surface of the intermediate surface and the barrel arm.

What is claimed is:

1. A connector configured to be attached to a coaxial cable having a signal line, a dielectric layer covering the signal line, a shield covering the dielectric layer, and an insulating sheath covering the shield, the connector comprising:

a signal contact conductor comprising:

a contact portion configured to contact a mate signal contact portion of a mate connector; and a connection portion configured to connect to the signal line exposed at a first exposing portion formed at a terminal portion of the coaxial cable;

a ground contact conductor comprising:

a fitting portion surrounding the contact portion and configured to fit to a mate ground contact portion of the mate connector; and a clamp portion configured to externally hold a second exposing portion of the coaxial cable adjacent to the first exposing portion and to contact the shield exposed at the second exposing portion, without the ground contact conductor overlapping an outer peripheral surface of the insulating sheath; and a housing configured to hold the connection portion between the fitting portion and the clamp portion, wherein the fitting portion and the clamp portion are integrally formed from a single metal plate of the ground contact conductor, wherein the ground contact conductor further comprises a barrel portion which includes a barrel base and a barrel arm configured to sandwich the housing between the barrel base and the barrel arm, and wherein a height of the housing located between the barrel base and the barrel arm is smaller than an outer diameter of the second exposing portion.

2. The connector according to claim 1, wherein the clamp portion is located outside the fitting portion and is configured to hold the second exposing portion such that an axial direction of the signal line intersects a radial center line of the fitting portion.

3. The connector according to claim 2, wherein the connection portion is located between the fitting portion and the clamp portion, and wherein the fitting portion is C-shaped to have an opening through which the signal contact conductor passes.

4. The connector according to claim 3, wherein the housing comprises:

a first housing portion configured to hold the contact portion in the fitting portion; and a second housing portion configured to hold the connection portion between the fitting portion and the clamp portion.

5. The connector according to claim 4, wherein the barrel portion is configured to hold the second housing portion between the fitting portion and the clamp portion.

6. The connector according to claim 5, wherein a gap is formed between the clamp portion and the second housing portion to accommodate a portion of the second exposing portion.

7. The connector according to claim 6, wherein the barrel portion is configured to hold the portion of the second exposing portion accommodated in the gap.

8. The connector according to claim 5, wherein the ground contact conductor has a plate-shaped portion configured to close one end of the fitting portion without the plate-shaped portion overlapping an outer peripheral surface of the fitting portion, and wherein the plate-shaped portion extends out of the fitting portion to comprise a part of the barrel portion and a part of the clamp portion.

9. The connector according to claim 1, wherein the ground contact conductor further comprises a holding claw portion projecting from the barrel arm toward the barrel base to press the shield against the dielectric layer.

10. The connector according to claim 9, wherein the holding claw portion is located between the housing and the clamp portion and located closer to the clamp portion.

11. The connector according to claim 1, wherein the connection portion comprises a first main surface and a second main surface located on an opposite side of the connection portion, and wherein the housing has a first opening configured to expose the first main surface toward the barrel base and a second opening configured to expose the second main surface toward the barrel arm.

12. The connector according to claim 11, wherein the signal line of the first exposing portion is connected to the first main surface.

13. The connector according to claim 12, wherein a width of the first opening along an axial direction of the signal line is greater than a width of the second opening along the axial direction.

14. The connector according to claim 13, wherein a depth of the first opening perpendicular to the axial direction is greater than a depth of the second opening perpendicular to the axial direction.

15. A connector configured to be attached to a coaxial cable having a signal line, a dielectric layer covering the signal line, a shield covering the dielectric layer, and an insulating sheath covering the shield, the connector comprising:

a signal contact conductor comprising:

a contact portion configured to contact a mate signal contact portion of a mate connector; and a connection portion configured to connect to the signal line exposed at a first exposing portion formed at a terminal portion of the coaxial cable;

a ground contact conductor comprising:

a fitting portion surrounding the contact portion and configured to fit to a mate ground contact portion of the mate connector; and a clamp portion configured to externally hold a second exposing portion of the coaxial cable adjacent to the first exposing portion and to contact the shield exposed at the second exposing portion, without the ground contact conductor overlapping an outer peripheral surface of the insulating sheath; and a housing portion configured to hold the connection portion between the fitting portion and the clamp portion, wherein the fitting portion and the clamp portion are integrally formed from a single metal plate of the ground contact conductor, and wherein the ground contact conductor further comprises:

a barrel portion configured to sandwich the housing portion between a barrel base and a barrel arm; and a pair of arm portions connected to opposite ends of the fitting portion in a circumferential direction, and the barrel portion is configured to hold the pair of arm portions together with the housing portion.

16. The connector according to claim 15, wherein the ground contact conductor has two contacting claw portions configured to press the pair of arm portions against the housing portion.

17. A method for assembling a connector on a coaxial cable having a signal line, a dielectric layer covering the signal line, a shield covering the dielectric layer, and an insulating sheath covering the shield, the method comprising:

bringing the signal line exposed at a first exposing portion formed at a terminal portion of the coaxial cable, into contact with a connection portion of a signal contact conductor held by an insulating housing that includes a first opening and a second opening;

inserting a supporting tool into the second opening to support the connection portion;

inserting a connection tool into the first opening; applying ultrasonic waves for ultrasonic bonding to the signal line in contact with the connection portion;

placing a first housing portion of the insulating housing that holds a contact portion of the signal contact conductor in a fitting portion of a ground contact conductor;

placing a second housing portion of the insulating housing that holds the connection portion outside the fitting portion;

externally holding a second exposing portion of the coaxial cable adjacent to the first exposing portion, by a clamp portion of the ground contact conductor so that the clamp portion contacts the shield exposed at the second exposing portion, without the ground contact conductor overlapping an outer peripheral surface of the insulating sheath, wherein the fitting portion and the clamp portion are integrally formed from a single metal plate of the ground contact conductor; and holding the second housing portion of the insulating housing and a part of the second exposing portion by a barrel portion of the ground contact conductor between the fitting portion and the clamp portion, wherein the barrel portion includes a barrel base and a barrel arm configured to sandwich the insulating housing between the barrel base and the barrel arm, wherein a height of the insulating housing located between the barrel base and the barrel arm is smaller than an outer diameter of the second exposing portion, wherein the ground contact conductor includes a holding claw portion projecting from the barrel arm toward the barrel base to press the shield against the dielectric layer, wherein the ultrasonic waves are applied by the connection tool, and wherein the signal line contacts the connection portion between the connection tool and the supporting tool.

18. The method according to claim 17, wherein the barrel portion comprises a barrel base and a barrel arm configured to sandwich the second housing portion between the barrel base and the barrel arm.

* * * * *